(12) United States Patent
Dave et al.

(10) Patent No.: US 6,289,488 B1
(45) Date of Patent: Sep. 11, 2001

(54) HARDWARE-SOFTWARE CO-SYNTHESIS OF HIERARCHICAL HETEROGENEOUS DISTRIBUTED EMBEDDED SYSTEMS

(75) Inventors: Bharat P. Dave, Howell; Niraj K. Jha, Princeton, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/025,537

(22) Filed: Feb. 17, 1998

Related U.S. Application Data

(60) Provisional application No. 60/038,488, filed on Feb. 24, 1997, provisional application No. 60/038,934, filed on Feb. 24, 1997, and provisional application No. 60/054,709, filed on Aug. 4, 1997.

(51) Int. Cl.$^7$ .............................. G06F 17/50; G06F 9/00; G06F 15/00; G06F 15/76
(52) U.S. Cl. ................................ 716/1; 716/7; 716/10; 709/102; 709/104; 712/28
(58) Field of Search ...................... 395/500.34; 703/13; 716/1

(56) References Cited

U.S. PATENT DOCUMENTS

| | | |
|---|---|---|
| 4,885,684 | 12/1989 | Austin et al. . |
| 5,202,987 | 4/1993 | Bayer et al. . |
| 5,210,872 | 5/1993 | Ferguson et al. . |
| 5,452,461 | 9/1995 | Umekita et al. . |
| 5,590,323 | 12/1996 | Kartalopoulos . |
| 5,742,821 | 4/1998 | Prasanna . |
| 5,768,594 | 6/1998 | Blelloch et al. . |
| 5,781,787 | 7/1998 | Shafer et al. . |

(List continued on next page.)

OTHER PUBLICATIONS

"A Global Criticality/Local Phase Driven Algorithm for the Constrained Hardware/Software Partitioning Problem", by Asawaree Kalavade and Edward A. Lee; 1994 IEEE, pp. 42–48.

(List continued on next page.)

*Primary Examiner*—Matthew Smith
*Assistant Examiner*—A. M. Thompson
(74) *Attorney, Agent, or Firm*—Steve Mendelsohn

(57) ABSTRACT

Hardware-software co-synthesis of an embedded system architecture entails partitioning of its specification into hardware and software modules such that its real-time and other constraints are met. Embedded systems are generally specified in terms of a set of acyclic task graphs. For medium-to-large scale embedded systems, the task graphs are usually hierarchical in nature. The embedded system architecture, which is the output of the co-synthesis system, may itself be non-hierarchical or hierarchical. Traditional non-hierarchical architectures create communication and processing bottlenecks, and are impractical for large embedded systems. Such systems require a large number of processing elements and communication links connected in a hierarchical manner, thus forming a hierarchical distributed architecture, to meet performance and cost objectives. The present invention addresses the problem of hardware-software co-synthesis of hierarchical heterogeneous distributed embedded system architectures from hierarchical or non-hierarchical task graphs. The co-synthesis algorithm has the following features: 1) it supports periodic task graphs with real-time constraints, 2) it supports pipelining of task graphs, 3) it supports a heterogeneous set of processing elements and communication links, 4) it allows both sequential and concurrent modes of communication and computation, 5) it employs a combination of preemptive and non-preemptive static scheduling, 6) it employs a new task clustering technique suitable for hierarchical task graphs, and 7) it uses the concept of association arrays to tackle the problem of multi-rate tasks encountered in multimedia systems.

24 Claims, 11 Drawing Sheets

U.S. PATENT DOCUMENTS

| | | | | |
|---|---|---|---|---|
| 5,870,588 | * | 2/1999 | Rompaey et al. | 395/500 |
| 6,097,886 | * | 8/2000 | Dave et al. | 395/500.44 |
| 6,110,220 | * | 8/2000 | Dave et al. | 716/3 |
| 6,112,023 | * | 8/2000 | Dave et al. | 395/500.48 |
| 6,117,180 | * | 9/2000 | Dave et al. | 703/20 |

OTHER PUBLICATIONS

"Algorithms for Scheduling Hard Aperiodic Tasks in Fixed–Priority Systems using Slack Stealing", by Sandra R. Thuel and John P. Lehoczky, 1994 IEEE, pp. 22–33.

"Allocation of Periodic Task Modules with Precedence and Deadline Constraints in Distributed Real–Time Systems",by Chao–Ju Hou and Kang G. Shin, 1992 IEEE Computer Society Technical Committee on Real–Time Systems, 11 pages.

"An Efficient Algorithm for Graph Isomorphism", by D.G. Corneil and C.C. Gotlieb, Journal of the Association for Computing Machinery, vol. 17, No. 1, Jan. 1970, pp. 51–64.

"An Optimal Algorithm for Scheduling Soft–Aperiodic Tasks in Fixed–Priority Preemptive Systems", by John P. Lehoczky and Sandra Ramos–Thuel, 1992 IEEE Computer Society Technical Committee on Real–Time Systems, 15 pages.

"Aperiodic Servers in a Deadline Scheduling Environment", by T.M. Ghazalie and T.P. Baker; Realtime Systems 9, (1995), pp. 31–67.

"Architectural Support For Designing Fault–Tolerant Open Distributed Systems", by Salim Hariri, Alok Choudhary, and Behcet Sarikaya, 1992 IEEE.

"Calculating the Maximum Execution Time of Real–Time Programs", by P. Puschner and C.H. Koza, The Journal of Real–Time Systems, 1,(1989), pp. 159–176.

"Communications Synthesis for Distributed Embedded Systems", by Ti–Yen Yen and Wayne Wolf, Proceedings of International Conference on Computer–Aided Design, pp. 288–294, Nov. 1995.

"Computer–Aided Hardware–Software Codesign", by Giovanni De Micheli, Aug. 1994 IEEE Micro Chips, Systems, Software, and Applications, 8 pages.

"Configuration–Level Hardware/Software Partitioning for Real–Time Embedded Systems", by Joseph G. D'Ambrosio and Xiaobo (Sharon) Hu, 1994 IEEE, pp. 34–41.

"Constrained Software Generation for Hardware–Software Systems", by Rajesh K. Gupta and Giovanni De Micheli, 1994 IEEE, pp. 56–63.

"Dynamic Critical–Path Scheduling: An Effective Technique for Allocating Task Graphs to Multiprocessors", by Yu–Kwong Kwok, Ishfaq Ahmad, IEEE Transactions on Parallel and Distributed Systems, vol. 7, No. 5, May 1996, 17 pages.

"Efficient Scheduling Algorithms for Real–Time Multiprocessor Systems", by Krithi Ramamritham, John A. Stankovic, and Perng–Fei Shiah, IEEE Transactions on Parallel and Distributed, vol. 1, No. 2, Apr. 1990, 12 pages.

"Exploiting Unused Periodic Time for Aperiodic Service Using the Extended Priority Exchange Algorithm", by Brinkley Sprunt, John Lehoczky, and Lui Sha, IEEE Computer Society Real–Time Systems Symposium, Dec. 6–8, 1988, pp. 251–258.

"Hardware–Software Co–Design of Embedded Systems", by Wayne H. Wolf, Proceedings of the IEEE, vol. 82, No. 8, Jul. 1994, pp. 967–989.

"A Hardware–Software Codesign Methodology for DSP Applications", by Asawaree Kalavade and Edward A. Lee, Sep. 1993 IEEE Design & Test of Computers, pp. 16–28.

"Hardware–Software Cosynthesis for Digital Systems", by Rajesh K. Gupta and Giovanni De Micheli, Sep. 1993, IEEE Design & Test of Computers, pp. 29–40.

A Hardware/Software Partitioner Using a Dynamically Determined Granularity, by Jörg Henkel and Rolf Ernst, DAC 97–6/97 Anaheim, CA, 3 pages.

"Hill–Climbing Heuristics for Optical Hardware Dimensioning and Software Allocation in Fault–Tolerant Distributed Systems", by Fausto Distant and Vincenzo Piuri, IEEE Transactions on Reliability, vol. 38, No. 1, Apr., 1989 pp. 28–39.

"Load Sharing with Consideration of Future Task Arrivals in Heterogeneous Distributed Real–Time Systems", by Chao–Ju Hou and Kang G. Shin, 1991 IEEE Real–Time Computer Laboratory, pp. 94–103.

"Low Overhead Fault Tolerance for Real–Time Distributed Systems: Application to Hardware/Software Co–Synthesis of Embedded Systems", by Santhanam Srinivasan and Niraj K. Jha, 31 pages, corresponding to conference paper presented Sep. 1995 in Proc. European Design Automation Conf.

"On–Line Scheduling of Hard Deadline Aperiodic Tasks in Fixed–Priority Systems", by Sandra Ramos–Thuel and John P. Lehoczky, 1993 IEEE, pp. 160–171.

"On–Line Scheduling of Real–Time Tasks", by Kwang S. Hong and Joseph Y.–T. Leung, 1988 IEEE Computer Society, pp. 244–250.

On the Complexity of Fixed–Priority Scheduling of Periodic, Real–Time Tasks, by Joseph Y.–T. Leung and Jennifer Whitehead, 1982 North–Holland Publishing Company, Performance Evaluation 2 (1982), pp. 237–250.

"On Non–Preemptive Scheduling of Periodic and Sporadic Tasks", by Kevin Jeffay, Donald F. Stanat, and Charles U. Martel, Dec. 1991 IEEE Twelfth Real–Time Systems Symposium, pp. 129–139.

Optimal Algorithms for Synthesis of Reliable Application–Specific Heterogeneous Multiprocessors, by Aurobindo Dasgupta and Ramesh Karri, IEEE Transactions on Reliability, vol. 44, No. 4, Dec. 1995, pp. 603–613.

"Optimal Priority Assignment for Aperiodic Tasks With Firm Deadlines in Fixed Priority Pre–Emptive Systems", by Robert Davis and Alan Burns, Information Processing Letters, vol. 53, No. 5, Mar. 1995, pp. 249–254.

"Performance Estimation for Real–Time Distributed Embedded Systems", by Ti–Yen Yen and Wayne Wolf, Dept. of Electrical Engineering, Princeton University, pp. 1–6, Proc. of Intl. Conf. on Computer Design, Oct. 1995.

"Process Partitioning for Distributed Embedded Systems", by Junwei Hou and Wayne Wolf, Sep. 1996 IEEE, pp. 70–75.

"Program Implementation Schemes for Hardware–Software Systems", by Rajesh K. Gupta, Claudionor N. Coelho Jr., and Giovanni De Micheli, Jan. 1994 IEEE, vol. 27, No. 1, pp. 48–55.

"Rate–Monotonic Analysis for Real–Time Industrial Computing", by Mark H. Klein et al., Jan. 1994, vol. 27, No. 1, pp. 24–33.

"Replication and Allocation of Task Modules in Distributed Real–Time Systems", by Chao–Ju Hou and Kang G. Shin, Jun. 1994, IEEE Computer Society, pp. 26–35.

"Scheduling Algorithms and Operating Systems Support for Real–Time Systems", by Krithi Ramamritham and John A. Stankovic, Proceedings of the IEEE, vol. 82, No. 1, Jan. 1994, pp. 55–67.

"Scheduling Parallel I/O Operations in Multiple Bus Systems", by Ravi Jain et al., Journal of Parallel and Distributed Computing 16, 1992, pp. 352–362.

"Scheduling Periodically Occurring Tasks on Multiple Processors", by Eugene L. Lawler and Charles U. Martel, Information Processing Letters, vol. 12, No. 1, Feb. 1981.

"Scheduling Slack Time in Fixed Priority Pre–emptive Systems", by R.I. Davis, K.W. Tindell, and A. Burns, Dec. 1993 IEEE Real–Time Systems Symposium, pp. 222–231.

"Scheduling Tasks with Resource Requirements in Hard Real–Time Systems", by Wei Zhao et al., IEEE Transactions on Software Engineering, vol. SE–13, No. 5, May 1987, pp. 564–577.

"Sensitivity–Driven Co–Synthesis of Distributed Embedded Systems", by Ti–Yen Yen and Wayne Wolf, International Symposium on System Synthesis, 1995, pp. 1–6.

"SIERA: A Unified Framework for Rapid–Prototyping of System–Level Hardware and Software", by Mani B. Srivastava and Robert W. Brodersen, IEEE Transactions on Computer–Aided Design of Integrated Circuits and Systems, vol. 14, No. 6, Jun. 1995, pp. 676–693.

"SOS: Synthesis of Application–Specific Heterogeneous Multiprocessor Systems", by Shiv Prakash and Alice C. Parker, Journal of Parallel and Distributed Computing, vol. 16, No. 4, pp. 338–351 (1992).

"SpecCharts: A VHDL Front–End for Embedded Systems", by Frank Vahid, Sanjiv Narayan, and Daniel D. Gajski, IEEE Transactions on Computer–Aided Design of Integrated Circuits and Systems, vol. 14, No. 6, Jun. 1995, pp. 694–706.

"Synthesis of Application Specific Instruction Sets", Ing–Jer Huang and Alvin M. Despain, IEEE Transactions of Computer–Aided Design of Integrated Circuits and Systems, vol. 14, No. 6, Jun. 1995, pp. 663–675.

"System–Level Synthesis of Low–Power Hard Real–Time Systems", by Darko Kirovski and Miodrag Potkonjak, DAC97, 6/97, Anaheim, CA, 6 pages.

"Task Allocation for Maximizing Reliability of Distributed Computer Systems", by Sol M. Shatz, Jia–Ping Wang, and Masanori Goto, IEEE Transactions on Computers, vol. 41, No. 9, Sep. 1992, pp. 1156–1160.

"TBFT: A Task–Based Fault Tolerance Scheme for Distributed Systems", by Shalini Yajnik, Santhanam Srinivasan, Niraj K. Jha, Seventh International Conference on Parallel and Distributed Computing Systems, Oct. 1994, 21 pages.

"TigerSwitch: A Case Study in Embedded Computing System Design", by Wayne Wolf, Andrew Wolfe, Steve Chinatti, Ravi Koshy, Gary Slater, and Spencer Sun, 0–8186–6315–4/94, 1994 IEEE, pp. 89–96.

"Embedded Architecture Co–Synthesis and System Integration", by Bill Lin et al., Hardware/Software Co–Design, Mar. 1996 IEEE, Fourth International Workshop, pp. 2–9.

"Hardware–Software Codesign and GRAPE", by Marlee Adé et al., Rapid System Prototyping, Jun. 1995, Proceedings, Sixth IEEE International Workshop on Rapid System Prototyping, pp. 40–47.

"Object–Oriented Co–Synthesis of Distributed Embedded Systems", by Wayne Wolf, Proceedings of the ASP–DAC '95/VLSI '95, Design Automation Conference, Sep. 1995, pp. 553–558.

"Architectural Support For Designing Fault–Tolerant Open Distributed Systems", by Salim Hariri, Alok Choudhary, and Behcet Sarikaya, 1992 IEEE.

"Calculating the Maximum Execution Time of Real–Time Programs", by P. Puschner and C.H. Koza, The Journal of Real–Time Systems, 1,(1989), pp. 159–176.

"Communication Synthesis for Distributed Embedded Systems", by Ti–Yen Yen and Wayne Wolf, Proceedings of International Conference on Computer–Aided Design, pp. 288–294, Nov. 1995.

"Computer–Aided Hardware–Software Codesign", by Giovanni De Micheli, Aug. 1994 IEEE Micro Chips, Systems, Software, and Applications, 8 pages.

"Configuration–Level Hardware/Software Partitioning for Real–Time Embedded Systems", by Joseph G. D'Ambrosio and Xiaobo (Sharon) Hu, 1994 IEEE, pp. 34–41.

"Constrained Software Generation for Hardware–Software Systems", by Rajesh K. Gupta and Giovanni De Michel, 1994 IEEE, pp. 56–63.

"Dynamic Scheduling of Real–Time Aperiodic Tasks on Multiprocessor Architectures," by Babak Hamidzadeh and Yacine Atif, 1996 IEEE, Proceedings of the 29th Annual Hawaii International Conference on System Sciences, pp.

"Hardware–Software Co–Synthesis of Fault–Tolerant Real–Time Distributed Embedded Systems," by Santhanam Srinivasan and Niraj K. Jha, 1995 IEEE, Design Automation Conference 1995, with EURO–VHDL, Proceedings EURO–DAC '95, European.

Wolf, Wayne, Architectural Co–Synthesis of Distributed, Embedded Computing System, Princeton University Computer Engineering Technical Report CE–W94–24, Sep. 1994.*

Lin, B. et al., Embedded Architecture Co–synthesis and System Integration, Fourth International Workshop on Hardware/Software Co–Design, pp. 2–9, Mar. 1996.*

Wolf, Wayne, An Architectural Co–Synthesis Algorithm for Distributed, Embedded Computing Systems, IEEE Transactions of VLSI Systems, pp. 218–229, Jun. 1997.*

Ten et al., Sensitivity–driven co–synthesis of Distributed Embedded Systems, Proceedings of the Eighth International Symposium of System Synthesis, pp. 4–9, Sep. 1995.*

W. Wolf, Object–oriented Cosynthesis of Distributed Embedded Systems, ACM Trans. Design Autom. Electron. Syst., pp. 301–314, Jul. 1996.*

Sciuto et al., The Role of VHDL within the TOSCA Hardware/Software Codesign Framework, Proceedings of the Conference on European Design Automation Conference, pp. 612–617, Sep. 1994.*

Yen et al., Communication Synthesis for Distributed Embedded Systems, IEEE/ACM Conference on Computer–Aided Design, pp. 288–294, Nov. 1995.*

W. Ye, Fast Timing Analysis for Hardware–Software Co–Synthesis, 1993 IEEE International Conference on Computer Design, pp. 452–547.*

Ing–Jer Huang et al., Synthesis and Analysis of an Industrial Embedded Microcontroller, Design Automation Conference, 1997, pp. 151–156.*

Van Rompaey et al., CoWare–A Design Environment for Heterogeneous Hardware/Software Systems, Design Automation Conference, 1996, pp. 252–257.*

R. Ernst et al., Fast Timing Analysis for Hardware–Software Co–Synthesis, VLSI in Computers and Processors, pp. 452–457, Oct. 1993.*

R. Ernst et al., Hardware–Software Cosynthesis for Microcontrollers, IEEE Design & Test of Computers, pp. 64–75, Dec. 1993.*

B.P. Dave et al., COHRA: A Hardware–Software Cosynthesis of Hierarchical Heterogeneous Distributed Embedded Systems, Computer–Aided Design of Integrated Circuits and Systems, IEEE Transactions, pp. 900–919, Oct. 1998.*

B.P. Dave et al., COHRA: Hardware–Software Co–Synthesis of Hierarchical Distributed Embedded System Architectures, VLSI Design, 1998. Proceedings., pp. 347–354.*

D. Hermann et al., An Approach to the Adaptation of Estimated Cost Parameters in the COSYMA System, Proceedings of the Third International Workshop on Hardware/Software CoDesign, pp. 100–107, Sep. 1994.*

E. Lagnese et al., Architectural partitioning for System Level Synthesis of Integrated Circuits, IEEE Computer Aided Design of Integrated Circuits and Systems, pp. 847–860, Jul. 1991.*

* cited by examiner

FIG. 2A

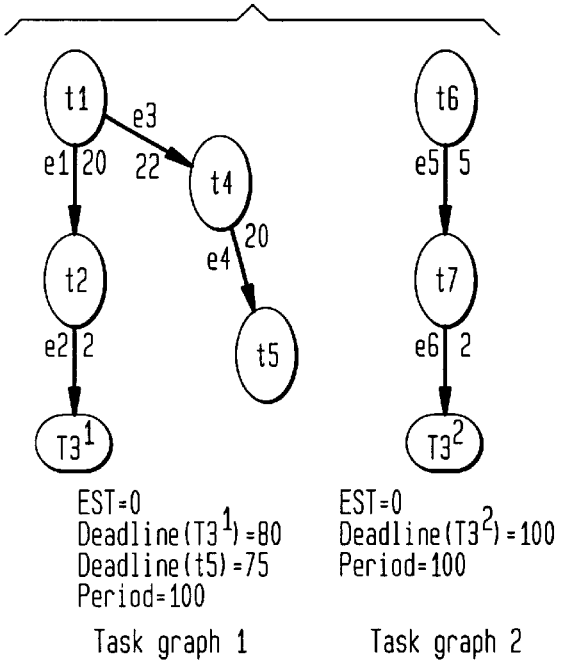

EST=0
Deadline(T3$^1$)=80
Deadline(t5)=75
Period=100

Task graph 1

EST=0
Deadline(T3$^2$)=100
Period=100

Task graph 2

FIG. 2B

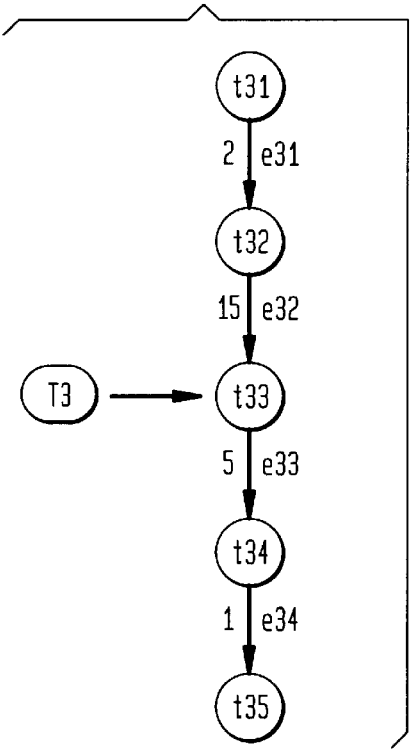

FIG. 2D

PE Library:
Cost of PE[P1,P2,A]=$[1100,500,70]

Link Library:
Cost of link[L]=$[35]

Communication mode=Sequential

FIG. 2E execution_vector(t1) =[10,x,x]
execution_vector(t2) =[15,x,x]
execution_vector(t31) =[5,x,x]
execution_vector(t32) =[2,2,x]
execution_vector(t33) =[x,x,20]
execution_vector(t34) =[2,2,x]
execution_vector(t35) =[1,x,x]
execution_vector(t4) =[10,x,x]
execution_vector(t5) =[10,x,x]
execution_vector(t6) =[1,x,x]
execution_vector(t7) =[10,x,x]

FIG. 2F layer_preference_vector(t1) =[1,0,0]
layer_preference_vector(t2) =[1,0,0]
layer_preference_vector(t31) =[1,0,0]
layer_preference_vector(t32) =[0,1,0]
layer_preference_vector(t33) =[0,0,1]
layer_preference_vector(t34) =[0,1,0]
layer_preference_vector(t35) =[1,0,0]
layer_preference_vector(t4) =[1,0,0]
layer_preference_vector(t5) =[1,0,0]
layer_preference_vector(t6) =[1,0,0]
layer_preference_vector(t7) =[1,0,0]

FIG. 5

```
COMPRESS_HIERARCHY(architecture,task graphs){
  current_arch=architecture;
  previous_arch_cost=previous_arch_merge_potential=previous_arch_layercount=∞;
  current_arch_merge_potential=number of PEs+number of links in current_arch;
  current_arch_layercount=number of layers in current_arch;
  current_arch_cost=cost of current_arch;
  while(current_arch_cost < previous_arch_cost OR
    current_arch_merge_potential < previous_arch_merge_potential OR
    current_arch_layercount < previous_arch_layercount){
    previous_arch_cost=current_arch_cost;
    previous_arch_merge_potential=current_arch_merge_potential;
    previous_arch_layercount=current_arch_layercount;
    IDENTIFY_MERGE_LAYERS(current_arch,task graphs){
      for each architecture layer{calculate the merge potential with respect to its neighboring layer;}
      for each layer $L_i${$L_i$_tag = UNPAIRED;}
      for each unpaired layer $L_j${
        merge_array = NULL;
        inter_layer_tuple($L_j$,$L_k$)←group $L_j$ with one of the adjacent layers, $L_k$,with
        which the merge potential is maximum;
        add inter_layer_tuple($L_j$,$L_k$)to merge_array;
        $L_j$_tag=$L_k$_tag = PAIRED;}
      for each element i of merge_array{i_tag = unexplored;}
      EXPLORE_MERGE{
        for each element j of merge_array{
          inter_layer_merge_array←identify the merge possibilities using architectural hints;
          j_tag=explored;}
        for each element k of the inter_layer_merge_array{k_tag=unexplored;}
        for each element l of inter_layer_merge_array{
          temp_arch←current_arch is modified considering l;
          l_tag = explored;
          perform merge←eliminate HFTs and HFEs from the associated task graph;
          run scheduler;
          if(deadlines are met){
            current_arch=temp_arch;
            current_arch_merge_potential=number of PEs + number of links in current_arch;
            current_arch_layercount = number of layers in current_arch;}
        }
      }
    }
  }
  return final_arch=current_arch;
}
```

$PFT(t35^1, t5, t35^2) = (80, 69, 66)$ $PFT(t35^1, t5, t35^2) = (78, 74, 66)$ $PFT(t35^1, t5, t35^2) = (78, 52, 66)$ $PFT(t35^1, t5, t35^2) = (78, 65, 98)$ $PFT(t35^1, t5, t35^2) = (78, 71, 97)$
COST=$1,845

FIG. 6G
| | |
|---|---|
| $P_1^1$ | {t1,0,10}{t2,10,25}{t31$^1$,25,30}{t6,32,33}{t7,33,43}{t31$^2$,43,48} {t4,51,61}{t5,61,71}{t35$^1$,77,78}{t35$^2$,96,97} |
| $L^1$ | {e31$^1$,30,32}{e31$^2$,49,51}{e34$^1$,76,77}{e34$^2$,95,96} |
| $P_2^1$ | {e32$^1$,32,34}{e32$^2$,51,53}{e34$^1$,74,76}{e34$^2$,93,95} |
| $L^2$ | {e32$^1$,34,49}{e33$^1$,69,74} |
| $A^1$ | {t33$^1$,49,69}     (x,y,z)={task(edge), start-time, finish-time} |
| $L^3$ | {e32$^2$,53,68}{e33$^2$,88,93} |
| $A^2$ | {t33$^2$,68,88} |
FIG. 6H
C1,t31$^1$,t35$^1$,C3,C2,t31$^2$,t35$^2$,t32$^1$,t34$^1$,t32$^2$,t34$^2$
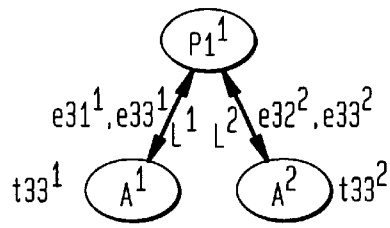
PFT(t35$^1$,t5,t35$^2$) = (102,96,112)
FIG. 6I
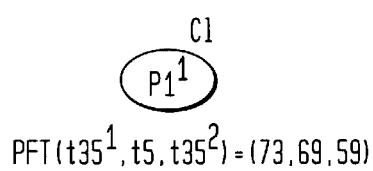
PFT(t35$^1$,t5,t35$^2$) = (73,69,59)
FIG. 6J
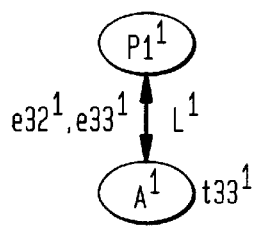
PFT(t35$^1$,t5,t35$^2$) = (71,67,59)

FIG. 6K
C1,t31$^1$,t35$^1$,C3
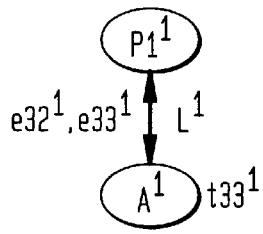
PFT(t35$^1$,t5,t35$^2$) = (71,65,59)
FIG. 6L
C1,t31$^1$,t35$^1$,C3,C2
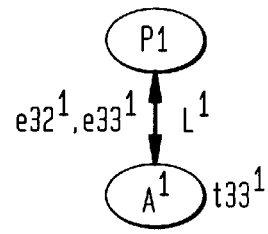
PFT(t35$^1$,t5,t35$^2$) = (82,76,104)
FIG. 6M
C1,t31$^1$,t35$^1$,C3      C2
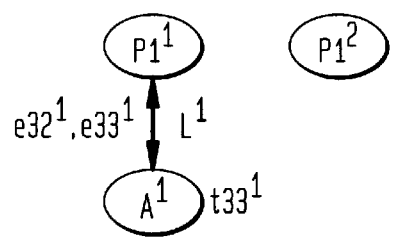
PFT(t35$^1$,t5,t35$^2$) = (71,65,59)
FIG. 6N
C1,t31$^1$,t35$^1$,C3      C2,t31$^2$,t35$^2$
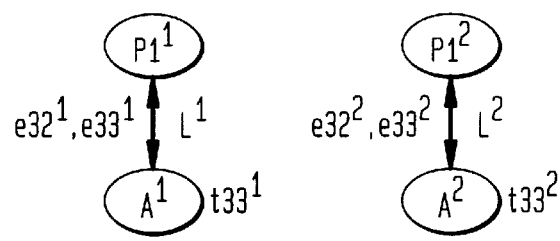
PFT(t35$^1$,t5,t35$^2$) = (71,65,57)
COST=$2,410
FIG. 6O
| P1$^1$ | {t1,0,10}{t2,10,25}{t31$^1$,25,30}{t4,45,55}{t5,55,65}{t35$^1$,70,71} |
|---|---|
| L$^1$ | {e32$^1$,30,45}{e33$^1$,65,70} |
| A$^1$ | {t33$^1$,45,65} |
| P1$^2$ | {t6,0,1}{t7,1,11}{t31$^2$,11,16}{t35$^2$,56,57} |
| L$^2$ | {e32$^2$,16,31}{e33$^2$,51,56} |
| A$^2$ | {t33$^2$,31,51} |

FIG. 7

TABLE 1: EXPERIMENTAL RESULTS FOR TELECOM SYSTEMS: COSYN VS COHRA

| EXAMPLE/ (NO. OF TASKS) | COSYN | | | | COHRA | | | | | |
|---|---|---|---|---|---|---|---|---|---|---|
| | NO. OF PEs/ LINKS | CPU TIME (SEC) | AVG. POWER (W) | COST ($) | NO. OF PEs/ LINKS | CPU TIME (SEC) | AVG. POWER (W) | COST ($) | POWER SAVINGS OVER COSYN (%) | COST SAVINGS OVER COSYN (%) |
| HROSI/(48) | 5/4 | 2.9 | 35.0 | 2,920 | 5/4 | 3.6 | 35.0 | 2,920 | 0.0 | 0.0 |
| HRDM/(128) | 8/3 | 34.0 | 27.2 | 3,268 | 9/3 | 38.1 | 21.6 | 2,473 | 20.6 | 24.3 |
| HROLS/(192) | 18/10 | 388.1 | 124.0 | 18,400 | 19/12 | 512.4 | 112.9 | 17,630 | 9.0 | $4.2^1/32.1^2$ |
| HRTS/(204) | 15/5 | 612.4 | 110.4 | 11,640 | 16/6 | 612.1 | 97.1 | 8,080 | 12.0 | 30.6 |
| HRBDCS/(326) | 20/6 | 900.3 | 212.5 | 20,600 | 21/12 | 1128.6 | 162.5 | 11,000 | 23.5 | 46.6 |
| HRATM/(442) | 28/11 | 1020.6 | 200.4 | 19,360 | 29/12 | 998.6 | 173.2 | 14,000 | 13.6 | 27.7 |
| HRNGCS/(528) | 28/9 | 1628.1 | 119.2 | 14,000 | 29/12 | 2011.6 | 84.8 | 9,268 | 28.9 | 33.9 |

FIG. 8

TABLE 2: EXPERIMENTAL RESULTS FOR TELECOM SYSTEMS: COSYN-LP AND COHRA-LP

| EXAMPLE/ (NO. OF TASKS) | COSYN-LP | | | | COHRA-LP | | | | | |
|---|---|---|---|---|---|---|---|---|---|---|
| | NO. OF PEs/ LINKS | CPU TIME (SEC) | AVG. POWER (W) | COST ($) | NO. OF PEs/ LINKS | CPU TIME (SEC) | AVG. POWER (W) | COST ($) | POWER SAVINGS OVER COSYN-LP (%) | COST SAVINGS OVER COSYN-LP (%) |
| HROSI/(48) | 5/5 | 3.4 | 28.7 | 3,558 | 5/5 | 3.9 | 28.7 | 3,558 | 0.0 | 0.0 |
| HRDM/(128) | 10/4 | 41.6 | 25.5 | 3,428 | 9/4 | 52.4 | 20.2 | 2,805 | 20.8 | 18.2 |
| HROLS/(192) | 18/10 | 419.6 | 120.6 | 18,640 | 14/12 | 721.8 | 111.3 | 17,910 | 7.7 | $3.9^1/27.6^2$ |
| HRTS/(204) | 16/5 | 649.8 | 88.1 | 12,392 | 17/6 | 637.4 | 80.7 | 9,405 | 8.4 | 24.1 |
| HRBDCS/(326) | 20/8 | 1086.4 | 197.8 | 22,700 | 20/12 | 1174.1 | 140.7 | 12,424 | 28.9 | 45.3 |
| HRATM/(442) | 29/12 | 1148.6 | 155.3 | 22,904 | 30/14 | 1046.1 | 139.2 | 16,614 | 10.4 | 27.5 |
| HRNGCS/(528) | 29/10 | 1916.1 | 105.8 | 15,648 | 31/12 | 2467.3 | 75.9 | 10,978 | 28.3 | 29.8 |

FIG. 9

TABLE 3: EXPERIMENTAL RESULTS FOR TELECOM SYSTEMS: COFTA AND COHRA-FT

| EXAMPLE/ (NO. OF TASKS) | COFTA | | | | COHRA-FT | | | | POWER SAVINGS OVER COFTA (%) | COST SAVINGS OVER COFTA (%) |
|---|---|---|---|---|---|---|---|---|---|---|
| | NO. OF PEs/ LINKS | CPU TIME (SEC) | AVG. POWER (W) | COST ($) | NO. OF PEs/ LINKS | CPU TIME (SEC) | AVG. POWER (W) | COST ($) | | |
| HROSI/(48) | 8/5 | 3.9 | 49.5 | 4,130 | 8/5 | 4.2 | 49.5 | 4,130 | 0.0 | 0.0 |
| HRDM/(128) | 13/5 | 72.9 | 43.9 | 5,137 | 14/6 | 94.3 | 37.9 | 4,219 | 13.7 | 17.9 |
| HROLS/(192) | 27/15 | 710.2 | 192.0 | 28,200 | 28/16 | 1183.5 | 178.7 | 27,180 | 6.9 | $3.6^1/24.3^2$ |
| HRTS/(204) | 24/11 | 724.2 | 152.2 | 16,320 | 24/12 | 698.7 | 135.4 | 13,440 | 11.0 | 17.6 |
| HRBDCS/(326) | 24/11 | 1684.2 | 266.0 | 25,920 | 29/17 | 1941.7 | 229.1 | 16,910 | 13.9 | 34.8 |
| HRATM/(442) | 37/16 | 1247.6 | 262.0 | 25,800 | 39/19 | 1441.8 | 230.1 | 20,750 | 12.2 | 19.6 |
| HRNGCS/(528) | 36/11 | 2194.6 | 152.4 | 17,798 | 38/20 | 2953.2 | 128.0 | 14,050 | 16.0 | 21.1 |

FIG. 10

TABLE 4: EXPERIMENTAL RESULTS FOR TELECOM SYSTEMS: COFTA-LP AND COHRA-FT-LP

| EXAMPLE/ (NO. OF TASKS) | COFTA-LP | | | | COHRA-FT-LP | | | | POWER SAVINGS OVER COFTA-LP (%) | COST SAVINGS OVER COFTA-LP (%) |
|---|---|---|---|---|---|---|---|---|---|---|
| | NO. OF PEs/ LINKS | CPU TIME (SEC) | AVG. POWER (W) | COST ($) | NO. OF PEs/ LINKS | CPU TIME (SEC) | AVG. POWER (W) | COST ($) | | |
| HROSI/(48) | 8/6 | 5.1 | 40.6 | 5,050 | 8/6 | 6.4 | 40.6 | 5,050 | 0.0 | 0.0 |
| HRDM/(128) | 13/6 | 91.7 | 41.3 | 5,536 | 14/6 | 118.4 | 35.6 | 4,781 | 13.8 | 13.6 |
| HROLS/(192) | 28/16 | 764.9 | 186.9 | 28,560 | 28/16 | 1274.2 | 176.0 | 27,640 | 5.8 | $3.2^1/20.2^2$ |
| HRTS/(204) | 24/12 | 739.4 | 122.1 | 18,906 | 25/14 | 756.4 | 116.0 | 15,740 | 5.0 | 16.7 |
| HRBDCS/(326) | 25/11 | 1921.4 | 242.4 | 27,840 | 28/17 | 2319.2 | 196.0 | 18,315 | 19.1 | 34.2 |
| HRATM/(442) | 38/16 | 1468.1 | 214.6 | 30,230 | 39/19 | 1608.9 | 191.2 | 24,345 | 10.9 | 19.5 |
| HRNGCS/(528) | 36/12 | 2711.3 | 135.2 | 19,860 | 39/20 | 3389.6 | 114.9 | 16,930 | 15.0 | 17.3 |

HARDWARE-SOFTWARE CO-SYNTHESIS OF HIERARCHICAL HETEROGENEOUS DISTRIBUTED EMBEDDED SYSTEMS

CROSS-REFERENCES TO RELATED APPLICATIONS

This nonprovisional U.S. national application, filed under 35 U.S.C. § 111(a), claims, under 35 U.S.C. § 119(e)(1), the benefit of the filing dates of (1) provisional U.S. national application No. 60/038,488, filed under 35 U.S.C. § 111(b) on Feb. 24, 1997; (2) provisional U.S. national application No. 60/038,934, filed under 35 U.S.C. § 111(b) on Feb. 24, 1997; and (3) provisional U.S. national application No. 60/054,709, filed under 35 U.S.C. § 111(b) on Aug. 4, 1997, the teachings of all three of which are incorporated herein by reference.

This application, Ser. No. 09/025,537, is one of the set of U.S. patent applications consisting of Ser. No. 09/024,604 (issued as U.S. Pat. No. 6,112,023 on Aug. 29, 2000); Ser. No. 09/024,605 (issued as U.S. Pat. No. 6,117,180 on Sep. 12, 2000); Ser. No. 09/024,839 (issued as U.S. Pat. No. 6,110,220 on Aug. 29, 2000); Ser. No. 09/025,097 (issued as U.S. Pat. No. 6,086,628 on Jul. 11, 2000); and Ser. No. 09/024,762 (issued as U.S. Pat. No. 6,097,886 on Aug. 1, 2000); all of which share the same filing date and the teachings of all of which are incorporated herein by reference.

BACKGROUND OF THE INVENTION

1. Field of the Invention

The present invention relates to the design of real-time distributed embedded systems, and, in particular, to the process of partitioning an embedded system specification into hardware and software modules using hardware-software co-synthesis.

2. Description of the Related Art

The architecture definition of embedded systems has generally largely been dependent on the ingenuity of system architects. However, in addition to a longer architecture definition interval, at times, the resulting architecture is either over-designed or fails to meet the specified constraints. Therefore, design automation in the area of hardware-software co-synthesis is of utmost importance from design time and quality of architecture standpoints. Finding an optimal hardware-software architecture entails selection of processors, application-specific integrated circuits (ASICs), and communication links such that the cost of the architecture is minimum and all real-time constraints are met. Hardware-software co-synthesis involves various steps such as allocation, scheduling, and performance estimation. The allocation step determines the mapping of tasks to processing elements (PEs) and inter-task communications to communication links. The scheduling step determines the sequencing of tasks mapped to a PE and sequencing of communications on a link. The performance estimation step estimates the finish time of each task and determines the overall quality of the architecture in terms of its dollar cost, ability to meet its real-time constraints, power consumption, fault tolerance, etc. Both allocation and scheduling are known to be NP-complete. See References (1)–(2). Therefore, optimal co-synthesis is computationally a very hard problem.

Researchers have primarily focused their interest in the last several years on hardware-software co-synthesis of one-CPU-one-ASIC architectures (see References (3)–(9)), where attempts have been made to move operations from hardware to software or vice versa to minimize cost and meet deadlines.

In the area of distributed system co-synthesis, the target architecture can employ multiple CPUs, ASICs, and field-programmable gate arrays (FPGAs). See Reference (10). Two distinct approaches have been used to solve the distributed system co-synthesis problem: optimal and heuristic.

In the optimal domain, the approaches are: 1) mixed integer linear programming (MILP) and 2) exhaustive. The MILP solution proposed in Reference (11) has the following limitations: 1) it is restricted to one task graph, 2) it does not handle preemptive scheduling, 3) it requires determination of the interconnection topology up front, and 4) because of time complexity, it is suitable only for small task graphs. A configuration-level hardware-software partitioning algorithm is presented in Reference (12) based on an exhaustive enumeration of all possible solutions. Its limitations are: 1) it allows an architecture with at most one CPU, 2) simulation is used for performance evaluation which is very time-consuming, and 3) the communication overheads are ignored.

There are two distinct approaches in the heuristic domain: 1) iterative (see References (13)–(20A), (16)), where an initial solution is iteratively improved through various moves, and 2) constructive (see fill References (17)–(19)), where the solution is built step-by-step and the complete solution is not available until the algorithm terminates. The iterative procedure given in References (13)–(15) has the following limitations: 1) it considers only one type of communication link, and 2) it does not allow mapping of each successive copy of a periodic task to different PEs. Another iterative procedure targeted for low power system is proposed in Reference (16). It uses power dissipation as a cost function for allocation and has the following limitations: 1) it ignores inter-task communication scheduling, and 2) it is not suitable for multi-rate systems commonly found in multi-media systems. A constructive co-synthesis procedure for fault-tolerant distributed embedded systems is proposed in Reference (17). However, it does not support communication topologies such as bus, local area network (LAN), etc., and its allocation step uses a pessimistic performance evaluation technique which may increase system cost. Also, it assumes that computation and communication can always be done in parallel, which may not be possible. It is also not suitable for multi-rate embedded systems, e.g., multi-media systems. The optimal approaches are only applicable to task graphs consisting of around 10 tasks, and the heuristic approaches cannot tackle hierarchical task graphs or architectures.

Hierarchical hardware-software architectures have been presented previously in Reference (20). There, a parameterized hierarchical architectural template is specified a priori, with ASICs at the lowest layer, general-purpose processors at the next higher layer, and single-board computers above that. Tasks from the task graphs are then manually allocated to one of these layers. However, such a pre-specified architectural template may not lead to the least expensive architecture, as pointed out in Reference (20) itself.

Large embedded systems are generally specified in terms of hierarchical task graphs. Thus, it is important for a co-synthesis algorithm to exploit and tackle such specifications. Also, non-hierarchical architectures for large embedded systems, such as those used in telecom applications, inherently create processing and communication bottlenecks. This can substantially increase the embedded system cost.

SUMMARY OF THE INVENTION

A constructive co-synthesis system, called COSYN, is proposed in Reference (18) which also targets general and low power distributed architectures. Another constructive co-synthesis system, called COFTA, is proposed in Reference (19) which targets fault-tolerant distributed architectures, and addresses reliability and availability of the embedded system during co-synthesis.

The present invention is directed to a heuristic-based co-synthesis technique, called COHRA (CO-synthesis of HieRarchical Architectures), which takes as input an embedded system specification in terms of hierarchical acyclic task graphs, and generates an efficient hierarchical hardware/software architecture that meets the real-time constraints. It has also been extended to optimize power consumption and fault tolerance. The present technique is suited to both small- and large-scale real-time embedded systems. For task graphs from the literature for which mixed integer linear programming (MILP) based optimal results (see Reference (11)) are known, COSYN (see Reference (18)) also obtains the same optimal results in many orders of magnitude smaller CPU time. Therefore, we compare the performance of COHRA with COSYN. Experimental results demonstrate the efficacy of COHRA.

In the present technique, a hierarchical architecture template is not pre-specified. It is up to the co-synthesis algorithm to come up with the most efficient hierarchical or non-hierarchical heterogeneous distributed system architecture as well as automatically perform allocation and scheduling to meet real-time and other constraints.

In one embodiment, the present invention is a method for designing the architecture of an embedded system, comprising a pre-processing phase and a synthesis phase. The pre-processing phase comprises the step of parsing one or more task graphs, one or more architectural hints, one or more system/task constraints, and a resource library for the embedded system. The synthesis phase, following the pre-processing phase, comprises the step of allocating one or more groups of one or more tasks in the tasks graphs to one or more processing elements in the resource library and allocating one or more edges in the tasks graphs to one or more communication links in the resource library, based on the architecture hints and performance evaluation of one or more possible allocations for each of the groups and edges in light of the system/task constraints.

In an alternative embodiment, the present invention is a method for designing the architecture of an embedded system, comprising a pre-processing phase and a synthesis phase. The pre-processing comprises the steps of (1) parsing one or more task graphs, one or more system/task constraints, and a resource library for the embedded system; and (2) performing task clustering on one or more non-hierarchical tasks in the tasks graphs to form one or more clusters for the embedded system. The synthesis phase, following the pre-processing phase, comprises the step of allocating the clusters and one or more hierarchical tasks in the tasks graphs to one or more processing elements in the resource library and allocating one or more edges in the tasks graphs to one or more communication links in the resource library, based on performance evaluation of one or more possible allocations for each of the clusters, edges, and hierarchical tasks in light of the system/task constraints phase.

In another alternative embodiment, the present invention is a method for designing the architecture of an embedded system, comprising a pre-processing phase, a synthesis phase, and a hierarchy compression phase. The pre-processing phase comprises the step of parsing one or more task m graphs, one or more system/task constraints, and a resource library for the embedded system. The synthesis phase, following the pre-processing phase, comprises the step of allocating one or more groups of one or more tasks in the tasks graphs to one or more processing elements (PEs) in the resource library and allocating one or more edges in the tasks graphs to one or more communication links in the resource library, based on performance evaluation of one or more possible allocations for each of the groups and edges in light of the system/task constraints. The hierarchy compression phase, following the synthesis w phase, comprises the step of merging at least two PEs into a single PE to generate a compressed embedded system that continues to meet the system/task constraints.

BRIEF DESCRIPTION OF THE DRAWINGS

Other aspects, features, and advantages of the present invention will become more fully apparent from the following detailed description, the appended claims, and the accompanying drawings in which:

FIGS. 2(a)–(f) show an exemplary embedded system specification;

FIG. 5 shows the pseudo-code for the procedure for hierarchy compression, according to one embodiment of the present invention;

FIG. 7 presents Table 1, which shows experimental results for telecom systems comparing COSYN vs. COHRA;

FIG. 8 presents Table 2, which shows experimental results for telecom systems comparing COSYN-LP vs. COHRA-LP;

FIG. 9 presents Table 3, which shows experimental results for telecom systems comparing COFTA vs. COHRA-FT; and FIG. 10 presents Table 4, which shows experimental results for telecom systems comparing COFTA-LP vs. COHRA-FT-LP.

DETAILED DESCRIPTION

1 Motivation Behind Hierarchical Architectures

Figure 1A:
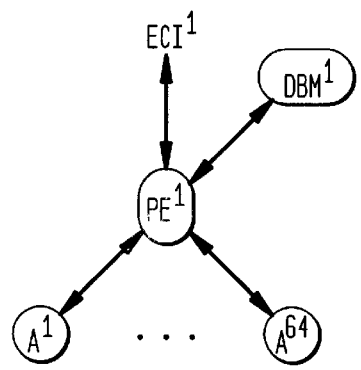
FIGS. 1(a)–(c) show non-hierarchical and hierarchical architectures for an echo-cancellation processing unit.
Figure 1B:
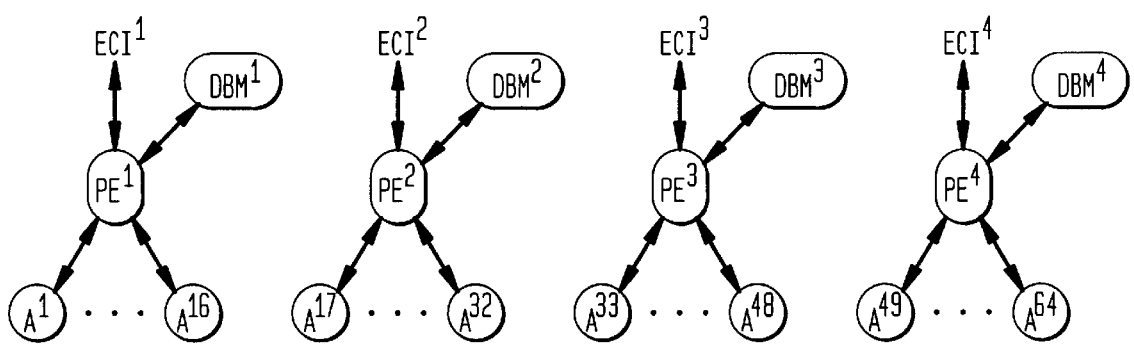
Figure 1C:
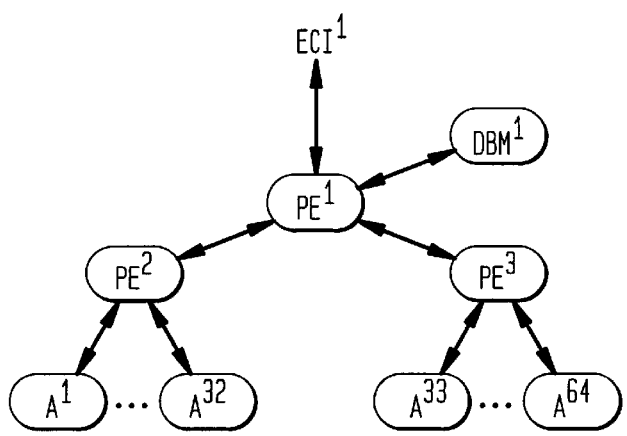

This section illustrates the significance of hierarchical architectures through an example borrowed from the area of telecom transport systems. Consider the non-hierarchical architecture topology for an echo-cancellation processing unit (ECPU) used in such systems, as shown in FIG. 1(a). The nodes in the architecture represent different processing elements (PEs), and edges denote communication links. $PE^1$ ($PE^i$ is the ith instance of PE) is responsible for control, communication, and monitoring functions related to the 64 subtending ASICs ($A^1$ through $A^{64}$). Each ASIC performs the echo-cancellation function for four telephone channels. $PE^1$ is also responsible for interpreting and forwarding external control messages for ECPU received via an external communication interface (ECI). In addition, $PE^1$ communicates with the data base manager (DBM) to support the configuration database for each ASIC. This architecture topology results in processing and communication bottlenecks around $PE^1$, since it is responsible for all communication and processing functions for all ASICs. It fails to meet the real-time constraints, since a single PE can handle communication, control, and monitoring of only 16 ASICs while providing ECI and DBM functions. This suggests the non-hierarchical architecture shown in FIG. 1(b) as a possible remedy. Though this architecture meets the real-time constraints, it requires three extra PEs, DBMs, and ECIs. However, this architecture is not practical since, typically, an external interface equipment can support only one ECI for each ECPU, and synchronization of the database among four DBMs may considerably slow down the processing. In such cases, a less costly hierarchical architecture, such as the one shown in FIG. 1(c), is preferable, where $PE^1$ delegates large amounts of control and processing functions to subtending processors $PE^2$ and $PE^3$. Also, since $PE^2$ and $PE^3$ are no longer required to support ECI and DBM functions, they can now support 32 ASICs. This hierarchical architecture eliminates communication and processing bottlenecks around $PE^1$ by making communication and processing of 32 ASICs local, and making control and monitoring of ASICs concurrent by employing $PE^2$ and $PE^3$. It is also less costly than the non-hierarchical architecture because it requires fewer PEs and links.

2 The Co-Synthesis Framework

Embedded systems consist of off-the-shelf general-purpose processors (e.g., Intel Pentium), ASICs, FPGAs, and communication links to perform application-specific functions. ASICs can be based on standard cells or gate arrays. The hardware architecture of an embedded system defines the type and interconnection of various hardware modules. Its software architecture defines the allocation of sequence of codes to specific general-purpose processors. Hardware-software co-synthesis is the process of obtaining the hardware and software architectures to meet performance, power, cost, and reliability goals. Each application-specific function is made up of several sequential and/or concurrent jobs. Each job is made up of several tasks. Tasks are atomic units performed by embedded systems. A task contains both data and control flow information. The embedded system functionality is usually described through a set of acyclic task graphs. Nodes of a task graph represent tasks. Tasks communicate data to each other. This is indicated by a directed edge between two communicating tasks.

Task graphs can be periodic or a periodic. Each periodic task graph has an earliest start time (EST), period, and deadline, as shown for an example in FIG. 2(a). Each task of a periodic task graph inherits the task graph's period. Each task in a task graph can have a different deadline. A periodic task graphs are not dealt with here.

Figure 2C:
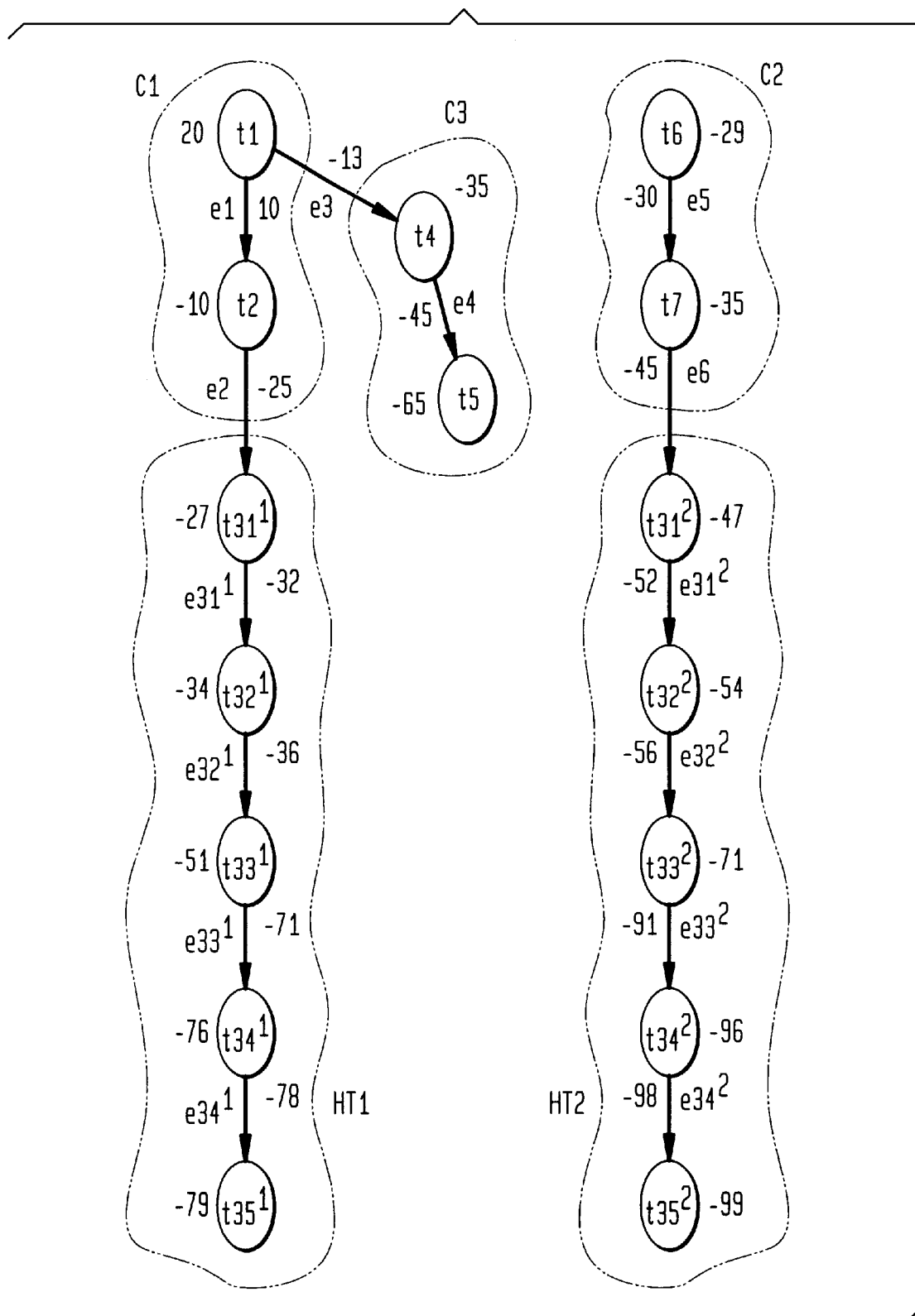

Generally, task graphs are generated in a hierarchical (top-down) process. Therefore, there is a natural hierarchy in the task graph. A hierarchical task graph has nodes which represent either non-hierarchical or hierarchical tasks. In FIG. 2(a), node $T3^1$ represents a hierarchical task, whereas t4 does not. A hierarchical task is a higher level abstraction of several interconnected hierarchical and/or non-hierarchical tasks. A task graph can have several levels of abstraction from the top one to the non-hierarchical (flat) task graph level, as shown in FIGS. 2(a)–(c).

Figure 3A:
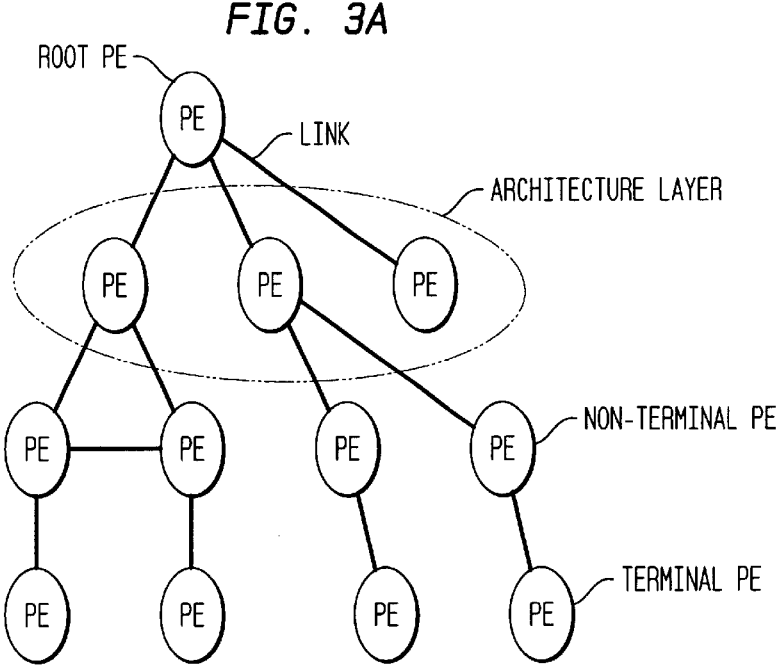
FIGS. 3(a)–(d) show an exemplary hierarchical architecture and hierarchy facilitating tasks and edges.

Medium- and large-scale embedded systems generally consist of a large number of PEs and communication links interconnected in a hierarchical manner. They can be represented by a hierarchical architecture graph such as the one shown in FIG. 3(a), where nodes represent PEs and edges represent communication links. PEs at the leaf nodes are known as terminal PEs and have no subtending PEs attached to them. PEs at intermediate nodes (other than leaf nodes) are known as non-terminal PEs. The PE(s) at the root node forms layer 1. PEs at a minimum distance of i (determined in terms of the number of communication links) from the root node are said to belong to layer i+1. In this architecture model, PEs at the higher level nodes communicate with the PEs located at the lower level nodes through intermediate nodes and vice versa. However, PEs located at the same architecture layer can communicate with each other directly without going through a higher level PE if there exists a direct communication link between them. Such architectures eliminate processing and communication bottlenecks.

Figure 3B:
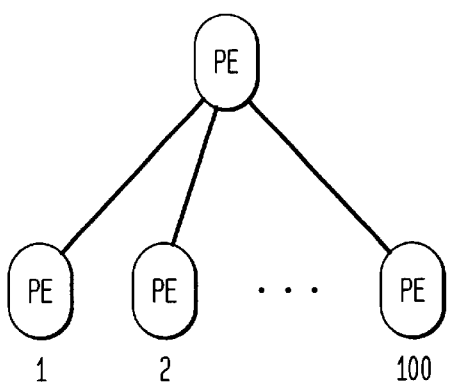
Figure 3C:
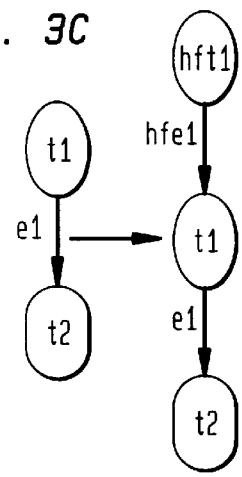
Figure 3D:
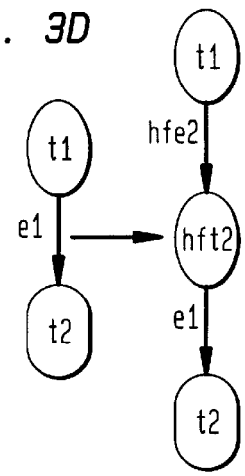

A non-hierarchical architecture for medium- and large-scale embedded systems can have a representation such as the one shown in FIG. 3(b). For some embedded systems, such an architecture may either be very expensive or infeasible, since a PE located at the root may need to be made responsible for a variety of higher level processing functions such as user interface, communication, control, monitoring, etc. This problem can be tackled through the concept of delegation of processing (task) and communication (edge). Tasks/edges from a PE located at one layer are delegated to PEs located at another layer to achieve computation and communication efficiencies. To illustrate this concept, consider the task graph of FIG. 3(c). Here, a directed edge represents flow of communication, not the direction of delegation. The direction of delegation indicates the direction in which a portion of processing is moved from one PE to another to share the processing load. Task to communicates with task t2 via edge e1. Suppose the execution time of t1 is very large, in which case it may be efficient to delegate this task to a PE at a subtending layer. In order to facilitate this task delegation, an extra It hierarchy facilitating task (HFT), hft1, is added to the task graph. This added task must be performed by a PE at a lower-numbered layer (i.e., at a higher level), which in turn communicates the required data via a hierarchy facilitating edge (liFE), hfe1, to task t1. Then t1 can be executed on a PE located at a higher-numbered layer. hft1 and hfe1 represent the overhead associated with task delegation. Similarly, as shown in FIG. 3(d), a communication edge e1 can be delegated to a link located at another layer by adding a preprocessing edge hfe2 and task hft2. HFTs and HFEs facilitate the derivation of a hierarchical distributed architecture. In the task graph of FIG. 2(b), in order to delegate the communication of task t31 with task t33 to a lower level, HFE e31 and HFT t32 are added to the task graph. Similarly, in order to delegate the communication of task t33 with task t35 to a higher level, HFT t34 and HFE e34 are added to the task graph. In the case of our motivational example in FIG. 1(a), HFTs and HFEs are added to the tasks allocated to $PE^1$ to facilitate delegation of their execution and communication to $PE^2$ and $PE^3$ of the hierarchical architecture shown in FIG. 1(c). HFTs and HFEs are illustrated in greater detail in an example in Section 3.7.

During co-synthesis, if two originally consecutive tasks are allocated to the same PE, then the associated HFTs and HFEs are removed from the task graph by setting their execution and communication costs, respectively, to zero. For example, in FIG. 2(c), if tasks t31 and t33 are allocated to the same PE, then the communication and execution costs of e31 and t32 are set to zero.

Architectural hints are usually generated during the top-down hierarchical task graph generation process by considering the type of task, previous experience of the designer, the type of resource library, etc. These hints are used to indicate whether: 1) the given task is hierarchical or non-hierarchical, 2) tasks from different instances of the same type of PE can be merged, 3) the task is targeted for reuse, 4) the task (edge) is an HFT (HFE), 5) the task is preemptible by a lower priority task, and 6) the task needs to be mapped to a particular layer of the architecture. Architectural hints are not necessary for the success of the present algorithm. However, when available, the present algorithm exploits them.

Embedded system specifications are mapped to elements of a resource library, which consists of a PE library and a link library. The PE library consists of various types of FPGAs, ASICs, and general-purpose processors. For each available processor, its cost, supply voltage, average quiescent power consumption, peak power constraint, memory architecture, processor-link communication characteristics, and cache characteristics are assumed to be specified. Also, the preemption overhead is specified in terms of the associated execution time, as well as the peak and average power dissipation. This overhead is determined experimentally considering the operating system overhead. It includes context switching and any other processor-specific overheads. For each ASIC, its cost and package attributes, such as available pin count, gate count, supply voltage, and average and peak power dissipation per gate, are assumed to be specified. Similarly, for each FPGA, its cost, supply voltage, average and peak power dissipation, initialization memory requirement, and the maximum number of programmable functional units (PFUs) are assumed to be specified. The link library consists of various types of links such as point-to-point, bus, and local area network (LAN). Each link is characterized by: 1) the maximum number of ports it can support, 2) an access time vector that indicates link access times for different number of ports on the link, 3) the number of information bytes per packet, 4) packet transmission time, etc. The resource library and its costs for two general-purpose processors, P1 and P2, an ASIC A, and a link L, are shown in FIG. 2(d).

The following definitions form the basis of the co-synthesis framework.

Definition 1: Execution_vector($t_i$)={$\pi_{i1},\pi_{i2},\ldots \pi_{in}$} is the execution vector of task $t_i$, where $\pi_{ij}$ indicates the execution time of task $t_i$ on PEj from the PE library. $\pi^{min}$ and $\pi^{max}$ denote the minimum and maximum execution times in this vector, respectively. For example, the execution vectors of the tasks in our example task graph, for the PE library of FIG. 2(d), are shown in FIG. 2(e). An x in this vector indicates that the task cannot be executed on the corresponding PE, as explained next.

Definition 2: Preferen_cevector($t_i$)={$\wp_{i1},\wp_{i2},\ldots,\wp_{in}$} is the preference vector of task $t_i$, where $\wp_{ij}$ indicates preferential mapping for task $t_i$. If $\wp_{ij}$ is 0, $t_i$ cannot be executed on PEj, and 1 if there are no constraints. This vector is useful in cases where preferred allocation is determined based on prior experience or task characteristics.

Definition 3: Layer_preference_vector($t_i$)={$\Lambda_{i1},\Lambda_{i2},\ldots,\Lambda_{iq}$} is the layer preference vector of task $t_i$, where $\Lambda_{ij}$ indicates preferential mapping of $t_i$ to the jth layer of the architecture hierarchy. $\Lambda_{ij}=1$ indicates that it is preferable to execute $t_i$ on a PE located at layer j, and $\Lambda_{ij}=0$ indicates that $t_i$ be excluded from a PE located at layer j. However, if layer_preference_vector($t_i$) is a zero-vector (i.e., with all elements 0), it implies that $t_i$ can be allocated to a PE at any layer. For example, layer preference vectors of tasks from our example task graph are shown in FIG. 2(f).

Since the number of layers in the hierarchical architecture is not known a priori, a pre-defined upper bound on the number of layers is used to specify this vector. (In the hierarchy compression phase of the algorithm (see Section 3.5), the unneeded layers are removed.)

Definition 4: Exclusion_vector($t_i$)={$\chi_{i1},\chi_{i2},\ldots,X_{ip}$} is the exclusion vector of task $t_i$, which specifies which tasks can co-exist with $t_i$ on the same PE. $X_{ij}=1$ indicates that tasks $t_i$ and $t_j$ have to be allocated to different PEs, and $X_{ij}=0$ indicates there are no constraints.

Definition 5: A cluster of tasks is a group of tasks that are always allocated to the same PE. Clustering of tasks in a task graph reduces the communication times and significantly speeds up the co-synthesis process. However, for any two tasks to be clustered together, their layer preference vectors must be identical or at least one task's layer preference vector must be the zero-vector (indicating no layer preference).

Definition 6: Preference_vector($C_k$) of cluster $C_k$ is the bit-wise logical AND of preference 15[] vectors of all tasks in the cluster. This vector indicates which PEs the cluster cannot be allocated to.

Definition 7: Layer_preference_vector($C_k$) of cluster $C_k$ is the bit-wise logical OR of the layer preference vectors of all the tasks in the cluster.

Definition 8: Exclusion_vector($C_k$) of cluster $C_k$ is the bit-wise logical OR of the exclusion vectors of all the tasks in the cluster.

Definition 9: Task $t_i$ is said to be preference-compatible with cluster $C_k$ (task $t_j$) if the bit-wise logical AND of the preference vector of cluster $C_k$ (task $t_j$) and $t_i$ does not result in the zero-vector. If all elements of a preference vector of cluster $C_k$ are 0, it makes the cluster unallocatable to any PE.

Definition 10: Task $t_i$ is said to be layer-preference-compatible with cluster $C_k$ (task $t_j$) if either the layer-preference vector of $C_k$ ($t_j$) and $t_i$ are identical or one of the two vectors is a zero-vector.

Definition 11: Task $t_i$ is said to be exclusion-compatible with cluster $C_k$ if the ith entry of the exclusion vector of $C_k$ is 0. This indicates that tasks in cluster $C_k$ can be co-allocated with task $t_i$. If task $t_i$ is preference-, exclusion- and layer-preference-compatible with cluster $C_k$ (task $t_j$), then it is simply said to be compatible with $C_k$ ($t_j$).

Definition 12: Communication_vector($e_j$)={$\psi_{j1},\psi_{j2},\ldots,\psi_{jm}$} is the communication vector of edge $e_j$, where $\psi_{j1}$ indicates the time it takes to communicate the data on edge $e_j$ on communication link 1 from the link library. $\psi^{min}$ and $\psi^{max}$ denote the minimum and maximum communication times in this vector, respectively. Since there is only one link in the link library in FIG. 2(d), the communication times are simply indicated next to the arcs in the task graphs in FIGS. 2(a) and 2(b).

Definition 13: The access_time_vector(l)={$\Omega_{l1},\Omega_{l2},\ldots,\Omega_{lm}$} is an access time vector for link l, where $\Omega_{lr}$ represents the access time per packet with r ports on link l. As mentioned before, a communication link can take different forms such as point-to-point, bus, LAN, etc. This is taken into consideration through the communication vector. The communication vector for each edge is computed a priori for various types of links as follows. Let $\rho_j$ be the number of bytes that need to be communicated on edge $e_j$, $\alpha_l$ be the number of bytes per packet that link l can support, excluding the packet overhead. Suppose the link under consideration, l, has s ports. Let $\tau_l$ be the communication time of a packet on link l. Some communication links may incur a per packet access overhead called $\Delta_l$ for link l, which is assumed to be included in $\tau_l$. Then the communication time of edge j on link l, $\psi_{jl}$ is given by:

$$\psi_{jl}=\lceil(\rho_j)\div(\alpha_l)\rceil\cdot(\tau_l+\Omega_{ls})$$

The link access overhead per packet can be reduced in case of large messages requiring multiple packets. At the beginning of co-synthesis, since the actual number of ports on the links is not known, an average number for $\Omega_l$ (specified a priori) is used to determine the communication vector. This vector is recomputed after each allocation, considering the actual number of ports on the link.

The memory architecture of embedded systems plays an important role from performance and cost points of view. Storage requirements are of different types: program storage, data storage, and stack storage.

Definition 14: The memory vector of task $t_i$ is defined as: memory_vector($t_i$)={program_storage($t_i$), data_storage ($t_i$), stack_storage($t_i$)}.

For each allocation, the algorithm checks whether the available memory capacity has been exceeded. While adding an FPGA to the architecture, the algorithm also ensures that the boot memory storage is sufficient to store the initialization code required by the FPGA.

The synthesized architecture must contain an efficient hierarchy to meet performance and cost constraints. The algorithm performs hierarchy compression (optimization) considering the architecture and inter-architecture layer merge potential which are based on the following definition.

Definition 15: Two PEs k and l are said to be merge-compatible if each task allocated to PE k is preference- and exclusion-compatible with each task allocated to PE l.

3 The COHRA Algorithm

Figure 4:
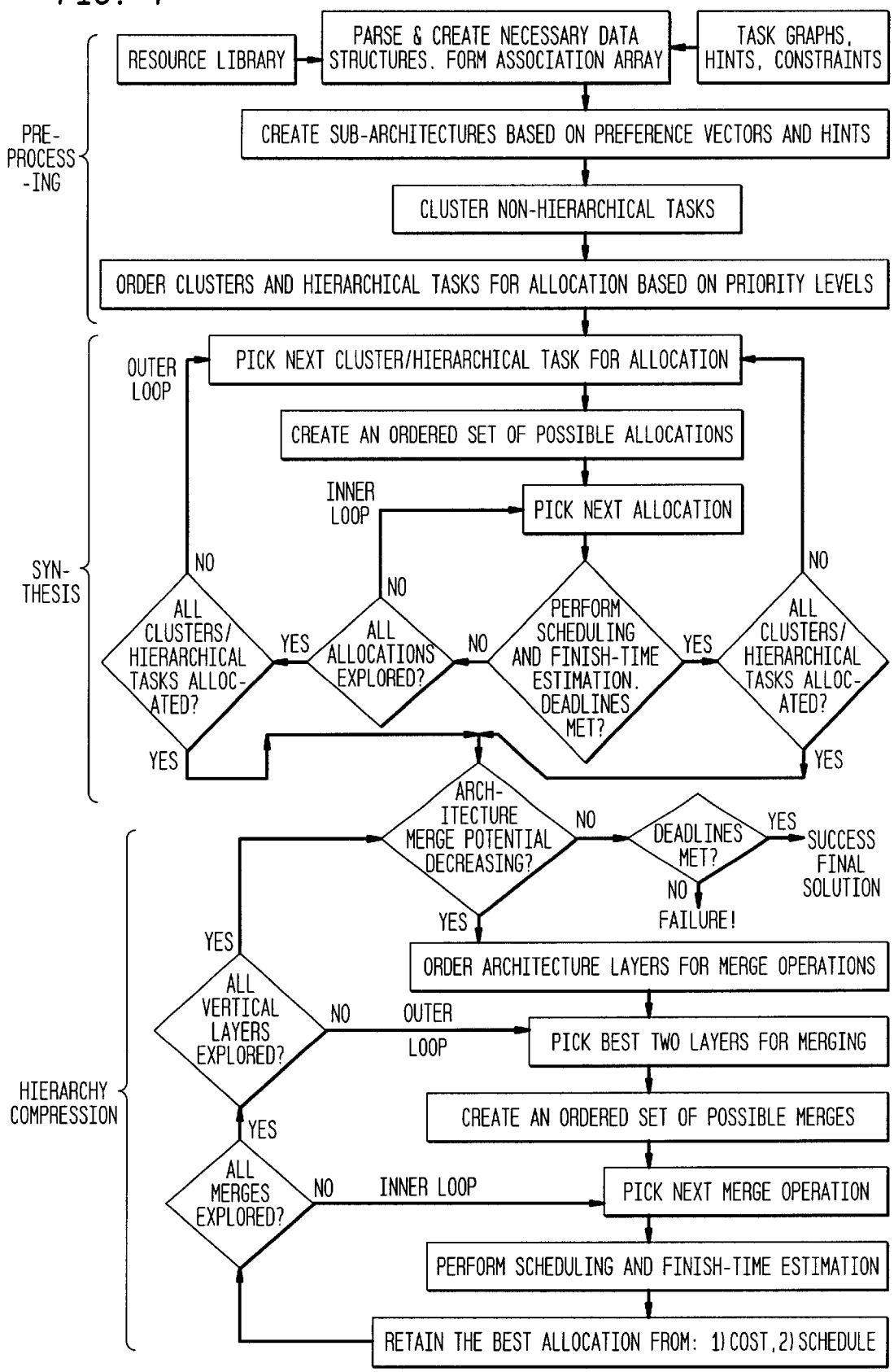
FIG. 4 shows the co-synthesis process flow for hierarchical architectures, according to one embodiment of the present invention.

This section provides an overview of COHRA. FIG. 4 presents one possible co-synthesis process flow for the present invention. This flow is divided up into three parts: pre-processing, synthesis, and hierarchy compression. During pre-processing, the algorithm processes the task graph, system constraints, architectural hints, and resource library, and creates necessary data structures. The hyperperiod of the system is computed as the least common multiple (LCM) of the periods of the various task graphs in the specification. In traditional real-time computing theory, if $period_i$ is the period of task graph i then (hyperperiod÷$period_i$) copies are obtained for it. See Reference (21). However, this is impractical from both co-synthesis CPU time and memory requirements points of view, especially for multi-rate task graphs where this ratio may be very large. The algorithm tackles this problem by using the concept of association array. See Reference (18). A sub-architecture (these sub-architectures correspond to the mapping of sub-task-graphs to part of the architecture being built) are also created for each hierarchical task that is marked for reuse based on architectural hints. The clustering step involves grouping of non-hierarchical tasks to reduce the search space for the allocation step. See References (17)–(19) and (22)–(23). Clustering of tasks in a hierarchical task is performed during its sub-architecture generation phase. Tasks in a cluster get mapped to the same PE. This significantly reduces the overall complexity of the co-synthesis algorithm since allocation is part of its inner loop. Then, clusters and hierarchical tasks are ordered based on their importance/priority. The synthesis step determines the allocation. It has two loops: 1) an outer loop for allocating each cluster/hierarchical task, and 2) an inner loop for evaluating various allocations for each cluster/hierarchical task. For each cluster/hierarchical task, an allocation array consisting of the possible allocations is created. The size of this array is kept at manageable levels by limiting the number of extra PEs and links added at each step. While allocating a cluster to a hardware module, such as an ASIC or FPGA, it is made sure that the module capacity related to pin count, gate count, and peak power is not exceeded. Similarly, while allocating a cluster to a general-purpose processor, it is made sure that the memory capacity of the PE is not exceeded. Inter-cluster/hierarchical task edges are allocated to resources from the link library.

The next step is scheduling which determines the relative ordering of tasks (edges) for execution (communication) and the start and finish times for each task (edge). The algorithm uses static scheduling. The algorithm also takes into consideration the operating system overheads such as interrupt overhead, context-switch, remote procedure call (RPC), etc., through a parameter called preemption overhead. Incorporating scheduling into the inner loop facilitates accurate performance evaluation.

Performance evaluation of an allocation is extremely important in picking the best allocation. An important part of performance evaluation is finish-time estimation. It determines the start and finish times of each task employing the longest path algorithm to check whether a task with a specified deadline meets it. The allocation evaluation step compares the current allocation against previous ones based on total dollar cost.

Once synthesis is done, hierarchy compression is used to optimize the hierarchy (number of layers) in the final architecture. In this part, the layers are collapsed by moving tasks from a PE at one layer to a PE at another layer. During the merging step, the algorithm explores the possibility of merging two PEs from two layers by replacing them with a single more expensive PE, if the overall cost of the architecture is reduced.

3.1 The Association Array

Traditionally, as mentioned before, each task graph is replicated the requisite number of times in the hyperperiod. This is the approach used in References (16)–(17). The advantage of this approach is that it allows different instances of a task to be allocated to different PEs. However, in order to address the impracticality of this approach when the hyperperiod is large compared to the periods, the concept of association array was proposed in Reference (18). This concept is used to eliminate the need for replication of task graphs. Experience from COSYN (see Reference (18)) shows that up to 13-fold reduction in co-synthesis CPU time is possible using this concept for medium-sized task graphs (with tasks numbering in hundreds) with less than 1% increase in embedded system cost.

An association array has an entry for each copy of each task and contains information such as: 1) the PE to which it is allocated, 2) its priority level, 3) its deadline, 4) its best-case finish time, and 5) its worst-case finish time. The deadline of the nth copy of a task is offset by (n-1) multiplied by its period from the deadline in the original task. The association array not only eliminates the need to replicate the task graphs, but it also allows allocation of different task copies to different PEs, if desirable, to derive an efficient architecture. This array is created after cluster formation and is updated after scheduling. This array also supports pipelining of task graphs, when necessary, to derive an efficient architecture. See Reference (18).

There are two types of periodic task graphs: 1) those with a deadline less than or equal to the period, and 2) those with a deadline greater than the period. In order to address this fact, an association array can have two dimensions, as explained next. If a task graph has a deadline less than or equal to its period, it implies that there will be only one instance of the task graph in execution at any instant. Such a task graph needs only one dimension in the association array, called the horizontal dimension. If a task graph has a period less than its deadline, it implies that there can be more than one instance of this task graph in execution at some instant. For such tasks, a two-dimensional association array is created, where the vertical dimension corresponds to concurrent execution of different instances of the task graph.

Tasks, which do not start at EST=0, may have the execution interval of their last copy exceed the hyperperiod. The portion of the execution interval, which exceeds the hyperperiod, is termed as hyperperiod spill. In order to ensure that the resulting schedule is feasible and resources are not overused, the algorithm makes space for the required hyperperiod spill at the beginning of the hyperperiod (since the schedule derived for a hyperperiod is repeated for successive hyperperiods). Hence, for such tasks the algorithm reassigns their priority level by adding the hyperperiod to it (a formal definition of priority level is given in Section 3.2). Doing this gives such tasks much higher priority than other tasks in the system, enabling them to find a suitable slot at the beginning of the next hyperperiod. The algorithm uses this reassigned priority level during scheduling. If the required spill is still not available after the priority level reassignment (this could be due to competing tasks which either required a spill or must start at the beginning of the hyperperiod), the allocation is upgraded by using more expensive PEs/links.

3.2 Task Clustering

Clustering involves grouping of tasks to reduce the complexity of allocation. The present clustering technique addresses the fact that different paths may become the longest path through the task graph at different points in the clustering process, since the length of the longest path changes after partial clustering. The critical path task clustering method given in Reference (18) is extended in order to address co-synthesis of hierarchical architectures from hierarchical task graphs. The present algorithm clusters only non-hierarchical compatible tasks. Clustering of tasks within a hierarchical task is done during its sub-architecture generation phase. In order to cluster tasks, the algorithm first assigns deadline-based priority levels to tasks and edges using the following procedure. A non-sink task $t_j$ may either have a deadline or not. We define $\omega(t_j)$ to be equal to the deadline of $t_j$ if the deadline is specified, and $\infty$ otherwise.

a. Priority level of sink task $t_i = \pi^{max}(t_i) - deadline(t_i)$.

b. Priority level of an edge $e_k$ = priority level of destination node $(e_k) + \psi^{max}(e_k)$.

c. Priority level of non-sink task $t_j$ = max (priority level of its fanout edge $e_f$, $-\omega(t_j)) + \pi^{max}(t_j)$.

As an example, the numbers adjacent to nodes and edges in FIG. 2(c) indicate their initial priority levels before any clustering is done. The priority level of a task is an indication of the longest path from the task to a task with a specified deadline in terms of computation and communication costs as well as the deadline. In order to reduce the schedule length, the algorithm decreases the length of the longest path by forming a cluster of tasks along the longest path. This makes the communication costs along the path zero. This is based on the traditional assumption in distributed computing that intra-PE communication takes zero time. Then the process can be repeated for the longest path formed by the yet unclustered tasks, and so on.

At the beginning, all tasks are sorted in the order of decreasing priority levels. The algorithm picks unclustered task $t_i$ with the highest priority level and mark it clustered. Then the algorithm finds the fan-in set of $t_i$, which is a set of non-hierarchical fan-in tasks that meet the following constraints: 1) the fan-in task is not clustered already with another fanout task, 2) the fan-in task's cluster $C_k$ is compatible with $t_i$, and 3) the cumulative size of tasks in $C_k$ does not exceed the cluster size threshold. If the fan-in set of $t_i$ is not empty, the algorithm identifies an eligible cluster which is grown (i.e., expanded) using a cluster growth procedure. If the fan-in set of $t_i$ is empty, the algorithm allocates a new cluster $C_j$ and uses the cluster growth procedure to expand it. In order to ensure load balancing among various PEs of the architecture, the cluster size should be limited. If the cluster size is too big, it may be prevented from being allocated to any PE. If it is too small, it would increase the total number of clusters and increase the computational complexity. The algorithm uses a parameter called cluster size threshold, $C_{th}$, to limit the size of the cluster. $C_{th}$ is set equal to the hyperperiod. At any point in the clustering procedure, for any cluster $C_k$ containing m tasks $\{t_1, t_2, \ldots t_m\}$, its size, denoted as $\theta_k$, is estimated by the following equation:

$$\theta_k = \sum_{i=1}^{m} \pi^{max}(t_i) \cdot (\Gamma \div p)$$

where p denotes the period of the tasks in cluster $C_k$ and $\Gamma$ is the hyperperiod.

The cluster growth procedure adds task $t_i$ to the feasible cluster identified from the fan-in set or to a new cluster, and grows the cluster further, if possible, by adding one of the compatible fan-out tasks of $t_i$ along which the priority level of $t_i$ is the highest. The algorithm recalculates the priority levels of the tasks in the task graph of $t_i$ after clustering t, either with any existing cluster or after clustering it with one of its fan-out tasks. This allows the algorithm to identify the changing critical path and to facilitate its compression. Experience from COSYN (see Reference (18)) shows that task clustering results in up to five-fold reduction in co-synthesis CPU time for medium-sized task graphs with less than 1% increase in embedded system cost.

Application of the clustering procedure to the example task graph results in three clusters (C1, C2, and C3), as shown in FIG. 2(c).

3.3 Cluster/Hierarchical Task Allocation

Once the clusters are formed, the algorithm needs to allocate the clusters as well as the hierarchical tasks. The priority level of a cluster/hierarchical task is defined as the maximum of the priority levels of the constituent tasks and incoming edges. Clusters/hierarchical tasks are ordered based on decreasing priority levels. After the allocation of each cluster/hierarchical task, the algorithm recalculates the priority level of each task, cluster, and hierarchical task. The algorithm picks the cluster/hierarchical task with the highest priority level and creates an allocation array. The allocations in the allocation array are ordered in the order of increasing dollar cost. Once the allocation array is formed, the algorithm uses the inner loop of co-synthesis to evaluate the allocations from this array.

3.3.1 The Outer Loop of Co-Synthesis

An allocation array is an array of the possible allocations for a given cluster at that point in co-synthesis. It considers the following: 1) architectural hints, 2) preference vector, 3) allocation of the cluster to existing resources in the partial architecture, 4) upgrade of links, 5) upgrade of PEs, 6) addition of PEs, and 7) addition of links. During allocation, addition of up to two new PEs and links of the same type are allowed to keep the size of the allocation array at manageable levels. However, the algorithm does allow the user to specify the limit on the number of new PEs and links of the same type that can be used at any step for allocation purposes. Once an allocation array is formed, the allocations in it are ordered based on the dollar cost.

3.3.2 The Inner Loop of Co-Synthesis

The algorithm first marks all allocations in the allocation array as unvisited. The algorithm picks the unvisited allocation with the least dollar cost, marks it visited, and goes through the scheduling and performance estimation steps described next.

3.4 Scheduling and Performance Estimation

The algorithm uses a priority-level based static scheduler for scheduling tasks and edges on all PEs and links in the allocation. The algorithm usually needs to schedule the first copy of the task only. The start and finish times of the remaining copies are updated in the association array. However, the algorithm does sometimes need to schedule some of the remaining copies. To determine the order of scheduling, the algorithm orders tasks and edges based on the decreasing order of their priority levels. If two tasks (edges) have equal priority levels, then the algorithm schedule the task (edge) with the shorter execution (communication) time first. While scheduling communication edges, the scheduler considers ion the mode of communication (sequential or concurrent) supported by the link and the processor. Though preemptive scheduling is sometimes not desirable due to the preemption overhead associated with it, it may be necessary to obtain an efficient architecture. Preemption of a higher priority task by a lower priority task is allowed only in the case when the higher priority task is a sink task which will not miss its deadline, in order to minimize the scheduling complexity.

The algorithm uses the finish-time estimation technique using the longest path algorithm from Reference (18) to estimate the finish times of all tasks with specified deadlines and check whether their deadlines are met. The scheduler provides accurate information on the start and finish times of the tasks in the allocated clusters. This, in turn, makes the present finish-time estimation method more accurate and minimizes the false rejection of an allocation. The algorithm stores the best- and worst-case start as well as finish times of each task and edge. Each node (edge) in the task graph has minimum and maximum execution (communication) times corresponding to the minimum and maximum entries in the corresponding execution (communication) vector. When a task (edge) gets allocated, its minimum and maximum execution (communication) times become equal and correspond to the execution (communication) time on the PE (link) to which it is allocated. Scheduling after each allocation step greatly improves the finish-time estimation accuracy compared to other approaches where finish time estimation assumes worst-case allocation (see Reference (17)), which often results in pessimistic estimates.

3.5 Allocation Evaluation

Each allocation is evaluated based on the total dollar cost. The algorithm picks the allocation that at least meets the deadline in the best case. If no such allocation exists, the algorithm picks an allocation for which the summation of the best-case finish times of all task graphs is maximum. The best-case finish time of a task graph is the maximum of the best-case finish times of the constituent tasks with specified deadlines. This generally leads to a less expensive architecture.

3.6 Hierarchy Compression/Optimization

During the inner and outer loops of allocation, the algorithm tends to compress the architecture in the horizontal direction by trying to allocate clusters/hierarchical tasks to the existing partial architecture if possible. However, the algorithm does not attempt to compress the hierarchy of the architecture in the vertical direction in those loops. The procedure outlined in FIG. 5 is used to reduce the number of layers in the architecture. Once all clusters/hierarchical tasks are allocated, it is possible that some of the deadlines are not yet met. The algorithm first identifies the architecture cost, merge potential (summation of number of PEs and links), and architecture layer count. If the architecture cost or the merge potential or the number of layers is decreasing, compared to the previous architecture, the algorithms explore inter-layer merges. The algorithm creates a merge array whose elements are inter-layer-tuples representing groups of two layers. An intermediate layer can be merged with its upper or lower layer. In order to form the inter-layer-tuple, the algorithm groups the layer with its immediate neighbor with which its merge potential is highest. Once the merge array is formed, hierarchy compression is performed using two loops: 1) an outer loop to evaluate each inter-layer-tuple from the merge array, and 2) an inner loop to evaluate various merges between two layers represented by the inter-layer-tuple. For each inter-layer-tuple, the algorithm derives the inter-layer merge array consisting of the possible merges based on a consideration of merge-compatible PEs. The algorithm explores each possible merge from the inter-layer merge array by modifying the architecture, followed by scheduling and finish time estimation. If the deadlines are met, the algorithm uses the modified architecture and explores the next possible merge from the inter-layer merge array. If all possible merges from the inter-layer merge array are explored, the algorithm takes the next inter-layer-tuple from the merge array and repeats the above process. Once all inter-layer-tuples from the merge array are explored, the algorithm compares the modified architecture with the previous architecture. If the architecture cost or the merge potential or its layer count is decreasing, then the algorithm tries to further compress the hierarchy by repeating the process of forming the merge array from the current architecture and exploring each element of the inter-layer-tuple of the merge array. The process stops when the algorithm can no longer reduce the architecture cost, merge potential, or layer count. If all deadlines are met at the completion of the hierarchy compression procedure, then the resulting architecture is the final architecture. If deadlines are not met at the end of hierarchy compression, the algorithm chooses the prior architecture that met the deadlines (if one exists) as the final architecture.

3.7 Application of the Co-Synthesis Algorithm

Figure 6A:
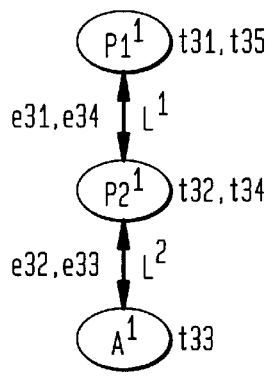
FIGS. 6(a)–(o) demonstrate stepping through the co-synthesis process, according to one embodiment of the present invention.
Figure 6B:
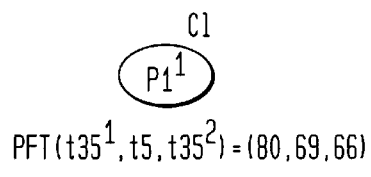
Figure 6C:
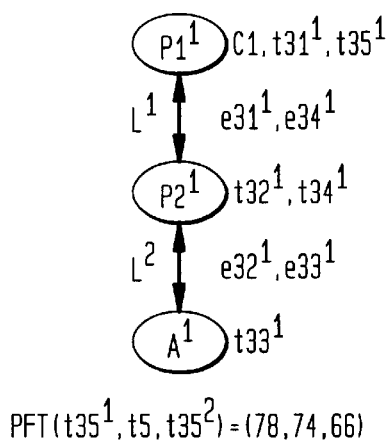
Figure 6D:
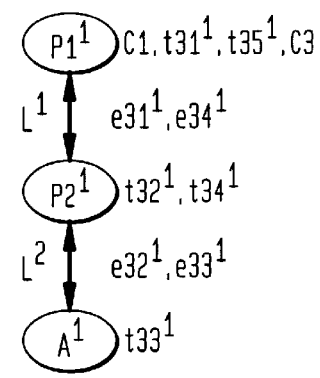
Figure 6E:
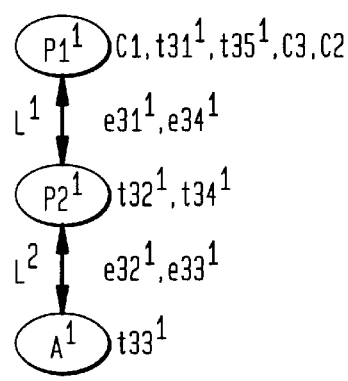
Figure 6F:
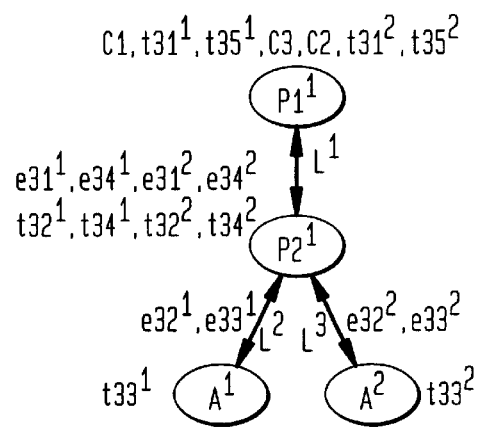

In this section, the co-synthesis algorithm is applied to the task graph of FIG. 2(*c*). There are three clusters (C1, C2, and C3) and two hierarchical tasks (HT1 and HT2), as shown in the figure. Since T3 is a hierarchical task graph and is reused at multiple places, as indicated by the architectural hint, the algorithm first synthesizes a sub-architecture for it, as shown in FIG. 6(*a*) (P1$^1$ is an instance of processor P1, and so on). This sub-architecture takes into consideration HFTs and HFEs and layer preference vectors. Next, the algorithm orders each cluster and hierarchical task in decreasing priority levels. The algorithm first allocates cluster C1, and the resulting architecture is shown in FIG. 6(*b*). The projected finish time (PFT) for the sink tasks t35$^1$, t5, and t35$^2$ are 80, 69, and 66, respectively. This indicates that the deadlines are met. The algorithm, therefore, considers HT1 for allocation next. Since HT1 uses the sub-architecture, the algorithm first checks whether the existing partial architecture has the required sub-architecture. Since, in this case, it does not, the algorithm adds the required PEs and links to the partial architecture to conform to the sub-architecture. The resulting architecture is shown in FIG. 6(c). The PFT indicates that the deadlines are met. Therefore, the algorithm chooses cluster C3 for allocation next. An attempt is made to allocate C3 to the current partial architecture. The resulting architecture is shown in FIG. 6(d). Since the PFT again indicates that the deadlines are met, cluster C2 is called for allocation next. As before, an attempt is made to allocate C2 to the existing partial architecture. The resulting architecture is shown in FIG. 6(e). Since deadlines are met, hierarchical task HT2 is called for allocation next. A sub-architecture exists for HT2. The resulting architecture is shown in FIG. 6(f). The associated schedule is shown in FIG. 6(g) which shows that all deadlines are met. Some of holes in the schedule are due to the assumption of sequential mode of computation and communication in this example. Since all clusters/hierarchical tasks are allocated, the algorithm moves on to the hierarchy compression stage of the co-synthesis algorithm to optimize the number of layers in the architecture. The algorithm evaluates each pair of layers in the hierarchy for inter-layer merge potential. In this case, the sole tuple is (layer 1, layer 2). Therefore, the algorithm merges the task allocation of $P1^1$ and $P1^2$. The resulting architecture is shown in FIG. 6(h). Since deadlines are not met and the architecture cannot be upgraded without increasing the cost, the algorithm rejects the merging of layers 1 and 2. Hence, the architecture shown in FIG. 6(f) is the final architecture.

Next the COSYN algorithm (see Reference (18)) is applied to this example. COSYN does not support the concept of a hierarchical architecture. In this case, the non-hierarchical task graph shown in FIG. 2(c) is used after making execution and communication times of all HFTs and BFEs zero. This essentially removes them from the task graph. First, cluster C1 is called for allocation and the architecture shown in FIG. 6(i) is created. Since the deadlines are met, HT1 (without HFTs and HFEs) is called for allocation next with the resulting architecture as shown in FIG. 6(j). The PFT indicates that the deadlines are met. Therefore, cluster C3 is called for allocation next, and the resulting architecture is shown in FIG. 6(k). The deadlines are still met. Hence, cluster C2 is called for allocation next, and the resulting architecture is shown in FIG. 6(l). Since all deadlines are not met, the architecture is upgraded as shown in FIG. 6(m). Now that the deadlines are met, HT2 is called for allocation next, and the resulting architecture is shown in FIG. 6(n). Since the deadlines are still met, this is the final architecture. The corresponding schedule is shown in FIG. 6(o). The architecture derived by COHRA (see FIG. 6(f)) has a cost of $1,845, whereas the architecture derived by COSYN (see FIG. 6(n)) has a cost of $2,410. This reduction in cost is due to the fact that COHRA can exploit hierarchy, whereas COSYN cannot. Incidentally, even though it is a heuristic, COSYN obtains optimal results for all the non-hierarchical task graphs available in the literature.

4 Extensions of COHRA for Low Power and Fault Tolerance

The following two sections describe how COHRA is extended to consider low power and fault tolerance objectives.

4.1 COHRA-LP

For some embedded systems, along with cost and real-time constraints, another important constraint is power dissipation. Therefore, for such systems, a co-synthesis algorithm must perform power optimization as well. The concepts from Reference (18) are very successful in achieving low power objectives.

It is assumed that, for each task and communication edge, peak and average power dissipation vectors are provided. These provide information on peak and average power dissipation numbers of each task (edge) on each PE (link) from the PE (link) library. Also, for each element of the resource library, the peak power constraint and the quiescent power dissipation are assumed to be specified a priori. The basic co-synthesis process of COHRA is also used in its low power extension, termed COHRA-LP. The following briefly describes how various steps are modified.

Task clustering: The clustering technique is modified to account for power dissipation. To each task and edge, energy levels are assigned. See Reference (18). The energy level indicates the longest path in terms of execution time, communication time, and average power dissipation. Deadline-based priority levels are still used to identify the order for clustering tasks. However, the algorithm uses energy levels instead of priority levels to form the clusters, since the objective is to minimize overall power consumption. Clustering along a higher energy-level path makes the communication time as well as communication energy for intra-cluster task edges zero. The concept of energy levels also enables taking into account the quiescent energy dissipation in PEs and link. The energy-level based clustering technique generally does not result in a significant increase in the schedule length. This is due to the fact that energy and schedule length optimization are not necessarily divergent goals. See Reference (24).

Cluster/hierarchical task allocation: In the outer loop of co-synthesis, entries in the allocation array are ordered based on an increasing average power dissipation. If there are more than one allocation with equal power dissipation, then the algorithm chooses the one with the least dollar cost. In the inner loop during performance estimation, the algorithm also performs power estimation using the technique from Reference (18). In case of processors (links), the average and peak power consumptions are estimated based on the tasks (edges) allocated to them. The quiescent power dissipation of a processor (link) indicates the power consumption during the idle time when no task (edge) is assigned to it. The peak power of a processor (link) is the maximum of the peak power dissipation of the tasks (edges) assigned to it. In order to compute the average power dissipation of a processor (link), the algorithm first computes its total energy consumption by summing up the average energy consumption of each task (edge) assigned to it and the energy consumption during the idle period. The average energy of a task (edge) is computed by multiplying its execution (communication) time in the hyperperiod by the associated average power dissipation. The average energy consumption during the idle period is computed by multiplying the corresponding quiescent power dissipation by the total idle period in the hyperperiod. The average power dissipation is computed by simply dividing the total energy consumption by the hyperperiod. In case of an FPGA/ASIC, the peak power is the summation of the peak power required by all tasks assigned to them and the quiescent power of the unused portion of the At FPGA/ASIC. The average energy/power dissipation estimation procedure for FPGA/ASIC is similar to the one given above for processors and links. To compute the system power dissipation, the algorithm divides the total estimated energy in PEs/links in it by the hyperperiod. The specified peak power of a member of the resource library is used as a constraint in the allocation process.

4.2 COHRA-FT

Fault-tolerant distributed embedded systems can offer high performance as well as dependability (reliability and availability) to meet the needs of critical real-time applications. For best results, hardware-software co-synthesis of such systems incorporates fault tolerance during the synthesis process itself. The concepts from Reference (19) are used to impart fault tolerance to the distributed embedded system architecture. The embedded system architecture is made fault-secure using the concept of task-based fault tolerance (TBFT) (see Reference (17)) against at least single PE faults. The link-level faults are addressed by traditional techniques such as data encoding, loss-of-signal detection, loss-of-clock detection, etc. Fault tolerance is accomplished through the addition of assertion tasks and duplicate-and-compare tasks to the system for fault-detection, followed by error recovery. An assertion task checks some inherent property/characteristic of the output data from the original task. If that property is not satisfied, it flags the output data as erroneous. Some common examples of assertion tasks used in telecom transport systems are: a) parity error detection, b) address range check, c) protection switch-control error detection, d) bipolar coding error detection, and e) checksum error detection. For each task, it is specified whether an assertion task is available or not. If not, the task is duplicated and the outputs of the two versions compared. For each assertion, an associated fault coverage is specified. It is possible that a single assertion is not sufficient to achieve the required fault coverage, and a combination of assertions is required. For each such task, a group of assertions and the location of each assertion is specified. For each check task (assertion or compare task), the weight of the communication edge between the checked task and check task and the execution vector of the check task is specified. The algorithm makes sure that a checked task and its check task are allocated to different PEs using the exclusion vector concept (see Section 1) so that a single PE fault does not affect both. Similarly, a task and its duplicate, if one exists, are also allocated to different PEs.

If a task is capable of transmitting any error at its inputs to its outputs, it is said to be error-transparent. Many tasks in real-life task graphs have this property. For example, a task graph for telecom input interface processing consists of the following tasks in a chain: preamplification, timing recovery, bipolar coding, framing, and payload processing. All these tasks are error-transparent, and one assertion task at the output of the chain suffices for fault detection purposes, if the fault detection latency (the time it takes to detect the fault) constraint is satisfied. The protection switch time includes the fault detection latency of the system and the error recovery time. In order to exploit the error transparency property properly, the cluster-based fault tolerance (CBFT) technique from Reference (19) is used. From experience with the COFTA co-synthesis system (see Reference (19)), the CBFT technique has been observed to realize up to 26% cost savings over TBFT (see Reference (17)), where an assertion or duplicate-and-compare task is used to check each original task.

In critical embedded system applications, the dependability of the system is of utmost concern.

The measures of dependability are reliability and availability. In general, systems in operation allow repair scenarios for failed components. For example, most of the telecom embedded systems are designed for critical applications requiring continuous operation where the repair scenario is allowed. Availability is a measure of the fraction of the time the system is available to perform the required functions and it is generally specified in terms of maximum allowed unavailability (1—availability) of the system in units of minutes per year. In order to facilitate dependability analysis, the failure-in-time (FIT) rate, and mean-time-to-repair (MTIR) are specified a priori for each hardware and software module. The FIT rate indicates the expected number of failures in 109 hours of operation. Also, different functions of embedded systems can have different unavailability constraints. Therefore, the unavailability constraints are specified for each task graph in the specification. Error recovery is enabled through a few spare PEs. In the event of failure of any service module (a set of PEs grouped together for replacement purposes), a switch to a standby module is made for efficient error recovery. The basic co-synthesis process of COHRA is also used in its extension for fault tolerance, termed COHRA-FT. The following describes how various steps are modified.

Task clustering: The algorithm uses the clustering technique (see Reference (19)) which exploits the error transparency property and determines the best placement of assertion and/or duplicate-and-compare tasks. This procedure is also used while creating the sub-architecture for hierarchical tasks. The algorithm assigns the assertion overhead and fault tolerance level (see Reference (19)) to each task. Assertion overhead of a task is the summation of execution and communication times of the additional tasks and edges required for fault detection purposes. The fault tolerance level of a task indicates the longest path from the task to a sink task considering the assertion overhead and communication. The algorithm uses priority levels to identify the order in which tasks are picked for clustering. However, once a task is picked, it is clustered with a compatible task along which it has the highest fault tolerance level. See Reference (19). Clustering along the highest fault tolerance level supports the ultimate objective of reducing the fault tolerance overhead while minimizing the schedule length and meeting real-time constraints.

Inner loop of co-synthesis: For each allocation, in addition to finish-time estimation, the algorithm explores whether any assertions need to be added, removed, or shared following scheduling. The error recovery topology is automatically identified during co-synthesis. The group of service and protection modules together form a failure group (FG). In order to derive an efficient error recovery N topology, the algorithm identifies FGs and interconnections such that the unavailability constraints of various task graphs are satisfied. The algorithm uses the architecture graph partitioning algorithm from Reference (19) to obtain the FGs. This graph partitioning algorithm solves a restricted form of the graph isomorphism problem (see References (25)–(26)), and exploits the architectural hints, when available. Markov models (see References (27)–(29)) are used to evaluate the availability of each FG and the distributed architecture.

Hierarchy compression: While evaluating each possible inter-layer merge, the algorithm also performs: 1) addition/removal of assertions, as necessary, to reduce the fault tolerance overhead, and 2) dependability analysis to ensure that the resulting architecture continues to meet the unavailability constraints.

4.3 COHRA-FT-LP

Both fault tolerance and low power optimization are incorporated in a system termed, COHRA-FT-LP. In this system, the algorithm follows the same procedure as COHRA-FT, except that the allocations in the allocation array are ordered in the order of increasing average power dissipation.

5 Experimental Results

COHRA is implemented in C++. It was run on various Bell Laboratories telecom transport system task graphs. These are large task graphs representing real-life field applications. The execution times for the tasks in these graphs were either experimentally measured or estimated based on existing designs. The general-purpose processors in the resource library had the real-time operating system, pSOS+, running on them. The execution times included the operating system overhead. For results on these graphs, the PE library was assumed to contain Motorola microprocessors 68360, 68040, 68060 (each processor with and without a second-level cache), 11 ASICs, one XILINX 3195A FPGA, one ORCA 2T15 FPGA, and two optical transmitter and receiver modules. The link library was assumed to contain a 680X0 bus, a 1 Mb/s LAN, a 10 Mb/s LAN, a 6.176 Mb/s serial link supporting broadcast mode, and a 31 Mb/s serial link. The FIT rates for various modules were either based on existing designs or estimated using Bellcore guidelines. See Reference (30). MTTR was assumed to be two hours since transport systems are considered as attended equipment. The unavailability constraints for task graphs providing provisioning and transmission functions were assumed to be 12 minutes/year and 4 minutes/year, respectively. For comparison, COSYN (see Reference (18)) and COFTA (see Reference (19)) were used. COSYN was used for comparison for the following two reasons: 1) it obtains the same optimal results in many orders of magnitude smaller CPU time compared to a MILP-based optimal method (see Reference (11)) for task graphs from the literature, and 2) there does not appear to exist any other co-synthesis algorithm that can tackle hierarchical task graphs and hierarchical architectures. COSYN-LP is a low power extension of COSYN.

As shown in Tables 1, 2, 3 and 4, COHRA consistently outperforms COSYN and COFTA both in terms of cost and power consumption. Cost of the architecture is the summation of the cost of PEs and links in it. When two architectures derived by two different algorithms have an equal number of PEs and links, but different dollar costs, it implies that they employ PEs/links of different types. Table 1 shows efficacy of COHRA with respect to COSYN. COHRA was able to reduce the architecture cost by an average of 23.9% (this is the average of individual cost reductions; the averages are computed similarly for other cases) and power consumption by an average of 15.4% over COSYN. Table 2 shows efficacy of COHRA-LP (low power extension) with respect to COSYN-LP. COHRA-LP realized average cost savings of 21.3% and average power savings of 14.9% over COSYN-LP. Table 3 shows the efficacy of the fault tolerance extension of COHRA, COHRA-FT, with respect to COFTA. COHRA-FT was able to achieve an average of 16.4% cost savings and 10.5% power savings over COFTA. Table 4 shows the efficacy of its fault tolerance and low power extension, COHRA-FT-LP, over COFTA-LP. COHRA-FT-LP was able to achieve an average of 14.9% cost savings and 9.9% power savings over COFTA-LP. The error of the power estimator used here was verified to be within 9% by comparing it against the power dissipation measurements from actual system implementations of telecom system task graphs. See Reference (18). COHRA did not result in large cost savings for the HROLS example over COSYN and COFTA because the optical receiver/transmitter modules dominated the cost. When these modules were excluded, the cost savings were higher, as indicated in the respective column. In case of HRBDCS, the architecture derived by COHRA-FT-LP realized $3,170 in savings when compared to the actual system architecture employed at Lucent Technologies. This corresponds to multi-million dollar savings from just the cost of the goods sold for this module. These savings do not reflect the additional savings which may result from other aspects such as manufacturing, assembly, test, etc. COHRA derived the same non-hierarchical architecture as COSYN and COFTA when a hierarchical architecture was not efficient, e.g., for HROSI. The CPU times are on Sparcstation 20 with 256 MB of DRAM.

The COHRA, COHRA-LP, COHRA-FT, and COHRA-FT-LP systems that achieved the experimental results described above were based on experimental software versions having many debug statements. As such, even further improvements in CPU time could be achieved by optimizing the code for performance.

6 Conclusions

The present invention is directed to an efficient co-synthesis algorithm for synthesizing hierarchical distributed embedded system architectures. Experimental results for various large real-life telecom system examples are very encouraging. This is the first work to tackle the concept of hierarchical task graphs in co-synthesis and automatically generate hierarchical architectures. Low power and fault tolerance considerations can also be incorporated into the algorithm. For these cases as 9 well, the efficacy of hierarchical architectures is established through experimental results.

REFERENCES

The following references are incorporated herein by reference:
(1) M. R. Garey and D. S. Johnson, Computers and Intractability: A Guide to the Theory of NP-Completeness, W. H. Freeman and Co., 1979.
(2) Y. -K. Kwok, and I. Ahmad, "Dynamic critical-path scheduling: An effective technique for allocating task graphs to multiprocessors," IEEE Trans. Parallel & Distributed Systems, vol. 7, no. 5, pp. 506–521, May 1996.
(3) R. K. Gupta, Hardware-software Cosynthesis of Digital Systems, Ph.D. thesis, Dept. of Electrical Engg., Stanford University, 1994.
(4) R. Ernst, J. Henkel and T. Benner, "Hardware-software co-synthesis for microcontrollers," IEEE Design & Test of Computers, vol. 10, no. 4, pp. 64–75, December 1993.
(5) F. Vahid, J. Cheng and D. D. Gajski, "A binary-constraint search algorithm for minimizing hardware during hardware/software partitioning," in Proc. European Design Automation Conf., pp. 214–219, September 1994.
(6) E. Barros, W. Rosenstiel and X. Xiong, "A method for partitioning UNITY language to hardware and software," in Proc. European Design Automation Conf., pp. 220–225, September 1994.
(7) A. Jantsch, P. Ellervee, J. Oberg, A. Hermani, and H. Tenhumen, "Hardware/software partitioning and minimizing memory interface traffic," in Proc. European Design Automation Conf., pp. 226–231, September 1994.
(8) A. Kalavade and E. A. Lee, "A hardware-software codesign methodology for DSP applications," IEEE Design & Test of Computers, vol. 10, no. 3, pp. 16–28, September 1993.
(9) A. Kalavade and E. A. Lee, "A global criticality/local phase driven algorithm for constrained hardware/software partitioning problem," in Proc. Int. Wkshp. Hardware-Software Co-Design, pp. 42–48, September 1994.
(10) W. Wolf, "Hardware-software co-design of embedded systems," Proc. IEEE, pp. 967–989, July 1994.
(11) S. Prakash and A. Parker, "SOS: Synthesis of application-specific heterogeneous multiprocessor systems," J. Parallel & Distributed Comput., vol. 16, pp. 338–351, December 1992.
(12) J. G. D'Ambrosio and X. Hu, "Configuration-level hardware/software partitioning for real-time systems," in Proc. Int. Wkshp. Hardware-Software Co-Design, pp. 34–41, 1994.

(13) T. -Y. Yen and W. Wolf, "Performance estimation for real-time distributed embedded systems," in Proc. Int. Conf. Computer Design, pp. 64–69, October 1995.

(14) T. -Y. Yen and W. Wolf, "Communication synthesis for distributed embedded systems," in Proc. Int. Conf Computer-Aided Design, pp. 288–294, November 1995.

(15) J. Hou and W. Wolf, "Process partitioning for distributed embedded systems," in Proc. Int. Wkshp. Hardware/Software Codesign, pp. 70–76, September 1996.

(16) D. Kirovski and M. Potkonjak, "System-level synthesis of low-power real-time systems," in Proc. Design Automation Conf., pp. 697–702, June 1997.

(17) S. Srinivasan and N. K. Jha, "Hardware-software co-synthesis of fault-tolerant real-time distributed embedded systems," in Proc. European Design Automation Conf., pp. 334–339, September 1995.

(18) B. P. Dave, G. Lakshminarayana, and N. K. Jha, "COSYN: Hardware-software co-synthesis of distributed embedded systems," in Proc. Design Automation Conf., pp. 703–708, June 1997.

(19) B. P. Dave and N. K. Jha, "COFTA: Hardware-software co-synthesis of heterogeneous distributed embedded system architectures for low overhead fault tolerance," in Proc. Int. Symp. Fault-Tolerant Computing, pp. 339–348, June 1997.

(20) M. B. Srivastava and R. W. Brodersen, "SIERA: A unified framework for rapid prototyping of system-level hardware and software," IEEE Trans. Computer-Aided Design, vol. 14, pp. 676–693, June 1995.

(21) E. Lawler and C. Martel, "Scheduling periodically occurring tasks on multiple processors," Information Processing Letters, vol. 12, pp. 9–12, February 1981.

(22) S. Kim and J. Browne, "A general approach to mapping of parallel computations upon multiprocessor architectures," in Proc. Int. Conf. Parallel Processing, vol. 12, pp. 1–8, August 1988.

(23) G. Sih and E. Lee, "A compile-time scheduling heuristic for interconnection constrained heterogeneous processor architectures," IEEE Trans. Parallel & Distributed Systems, vol. 4, pp. 175–186, February 1993.

(24) V. Tiwari, S. Malik and A. Wolfe, "Compilation techniques for low energy: An overview," in Proc. Symp. Low-Power Electronics, October 1994.

(25) D. G. Comeil and C. C. Gotlieb, "An efficient algorithm for graph isomorphism," J. ACM, vol. 17, no. 1, pp. 51–64, January 1970.

(26) C. M. Hoffman, Group-Theoretic Algorithms and Graph Isomorphism, Springer-Verlag, Berlin, 1982.

(27) N. Ravinchandran, Stochastic Methods in Reliability, John Wiley & Sons, New York, 1990.

(28) K. K. Aggarwal, Reliability Engineering, Kluwer Academic Publishers, Dodrecht, The Netherlands, 1993.

(29) J. D. Musa, A. Iannino, and K. Okumoto, Software Reliability: Measurement, Prediction, Application, McGraw-Hill, New York, 1990.

(30) Bellcore, "Generic reliability assurance requirements for fiber optic transport systems," Tech. Ref. TR-NTW-00418, December 1992.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for designing the architecture of an embedded system, comprising:

(a) a pre-processing phase comprising the step of parsing one or more task graphs, one or more architectural hints, one or more system/task constraints, and a resource library for the embedded system; and (b) a constructive co-synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on one or more of the architecture hints and performance evaluation of one or more possible allocations for each of the groups and edges in light of the system/task constraints, wherein an architectural hint provides a priori information that directs allocation of (1) a group of one or more tasks in a task graph towards a particular PE or (2) an edge in a task graph towards a particular communication link.

2. The method of claim 1, wherein at least one architectural hint is used to indicate whether a particular task is hierarchical or non-hierarchical.

3. The method of claim 1, wherein at least one architectural hint is used to indicate whether particular tasks from different instances of the same type of PE can be merged.

4. The method of claim 1, wherein at least one architectural hint is used to indicate whether a particular task is targeted for reuse.

5. The method of claim 1, wherein at least one architectural hint is used to indicate whether a e particular task is a hierarchy facilitating task.

6. The method of claim 1, wherein at least one architectural hint is used to indicate whether a particular edge is a hierarchy facilitating edge.

7. The method of claim 1, wherein at least one architectural hint is used to indicate whether a particular task is preemptible by a lower priority task.

8. The method of claim 1, wherein at least one architectural hint is used to indicate whether a particular task should be mapped to a particular layer of the architecture.

9. A method for designing the architecture of an embedded system, comprising:

(a) a pre-processing phase comprising the steps of:
(1) parsing one or more task graphs, one or more system/task constraints, and a resource library for the embedded system; and
(2) performing task clustering on one or more non-hierarchical tasks in the task graphs to form one or more clusters for the embedded system; and (b) a constructive co-synthesis phase, following the pre-processing phase, comprising the step of allocating the clusters and one or more hierarchical tasks in the task grab to one or more processing elements (PEs) in the resource library and allocating one or more edges in the task graphs to one or more communication links in the resource library, based on performance evaluation of one or more possible allocations for each of the clusters, edges, and hierarchical tasks in light of the system/task constraints.

10. The method of claim 9, wherein, during the pre-processing phase, one or more architectural hints indicate that one or more tasks are hierarchical tasks.

11. The method of claim 9, wherein, during the synthesis phase, the clusters and the hierarchical tasks are selected based on priority levels.

12. The method of claim 11, wherein, during the synthesis phase, the priority level of each task, cluster, and hierarchical task is recalculated after each cluster or hierarchical task is allocated.

13. The method of claim 9, wherein, during the synthesis phase, the clusters and the hierarchical tasks are selected based on average power dissipation.

14. The method of claim 9, wherein, during the pre-processing phase, one or more sub-architectures are generated for the embedded system and, during the synthesis phase, preference is given to allocating the clusters and the hierarchical tasks to the sub-architectures.

15. The method of claim 14, wherein the sub-architectures are generated based on one or more architectural hints.

16. The method of claim 14, wherein, during the pre-processing phase, preferences are specified for allocating one or more particular tasks to particular hierarchy layers of the embedded system and the sub-architectures are generated based on the layer allocation preferences.

17. The method of claim 9, wherein one or more hierarchical task graphs are reused one or more times in the embedded system.

18. The method of claim 9, wherein the pre-processing phase further comprises the step of parsing one or more hierarchy facilitating tasks (HFTs) and one or mote hierarchy facilitating edges (HFEs), which are used to indicate delegation of the tasks and edged.

19. The method of claim 9, wherein, if two originally consecutive tasks are allocated to the same PE, then any associated HFTs and HFEs are removed from the task graph.

20. A method for designing the architecture of an embedded system, comprising:

(a) a pre-processing phase comprising the step of parsing one or more task graphs, one or more system/task constraints, and a resource library for the embedded system;

(b) a constructive co-synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on performance evaluation of one or more possible allocations for each of the groups and edges in light of the system/task constraints; and (c) a hierarchy compression phase, following the synthesis phase, comprising the step of merging at least two PEs into a single PE to generate a compressed embedded system that continues to meet the system/task constraints.

21. The method of claim 20, wherein two PEs are merged into a single PE if each task allocated to one of the two PEs is preference- and exclusion-compatible with every task allocated to the other PE.

22. The method of claim 20, wherein at least two layers in the architecture are collapsed by moving one or more tasks from a PE at one layer to a PE at another layer.

23. The method of claim 20, wherein the hierarchy compression phase comprises the steps of:

(1) generating one or more possible merges for each of one or more pairs of layers in the architecture; and (2) performing one or more of the possible merges based on evaluation of results from performing scheduling for each possible merge for each pair of layers in light of the system/task constraints.

24. The method of claim 23, wherein steps (1) and (2) are repeated as long as at least one of architecture cost, merge potential, or layer count is decreasing.

* * * * *

UNITED STATES PATENT AND TRADEMARK OFFICE
CERTIFICATE OF CORRECTION

PATENT NO. : 6,289,488 B1
DATED : September 11, 2001
INVENTOR(S) : Bharat P. Dave and Niraj K. Jha It is certified that error appears in the above-identified patent and that said Letters Patent is hereby corrected as shown below:

Column 22, claim 5,
Line 28, replace "whether a e particular task" with -- whether a particular task --

Column 22, claim 9,
Line 51, replace "task grab to one or more" with -- task graphs to one or more --

Column 23, claim 18,
Line 21, replace "one or mote" with -- one or more --

Signed and Sealed this

Twelfth Day of March, 2002

Attest:

Attesting Officer

JAMES E. ROGAN
Director of the United States Patent and Trademark Office